United States Patent
Kudo et al.

(10) Patent No.: US 11,835,001 B1
(45) Date of Patent: Dec. 5, 2023

(54) ENGINE CONTROL SYSTEM

(71) Applicant: Mazda Motor Corporation, Hiroshima (JP)

(72) Inventors: Takeaki Kudo, Aki-gun (JP); Junki Hori, Aki-gun (JP); Masatoshi Seto, Aki-gun (JP); Tatsuya Fujikawa, Aki-gun (JP); Masahisa Yamakawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/188,911

(22) Filed: Mar. 23, 2023

(30) Foreign Application Priority Data

May 24, 2022 (JP) ................................ 2022-084251

(51) Int. Cl.
| | | |
|---|---|---|
| F02D 13/02 | (2006.01) | |
| F02D 41/40 | (2006.01) | |
| F02P 5/15 | (2006.01) | |
| F02P 5/04 | (2006.01) | |
| F02D 41/38 | (2006.01) | |

(52) U.S. Cl.
CPC ..... *F02D 13/0219* (2013.01); *F02D 13/0215* (2013.01); *F02D 13/0261* (2013.01); *F02D 13/0265* (2013.01); *F02D 41/40* (2013.01); *F02P 5/045* (2013.01); *F02P 5/1502* (2013.01); *F02D 2041/389* (2013.01); *F02D 2200/021* (2013.01)

(58) Field of Classification Search
CPC ............. F02D 13/0215; F02D 13/0219; F02D 13/0261; F02D 13/0265; F02D 2013/0292; F02D 2200/0802
See application file for complete search history.

(56) References Cited

U.S. PATENT DOCUMENTS

| | | | | |
|---|---|---|---|---|
| 5,626,109 A | * | 5/1997 | Yasumura | ........... F02D 13/0215 |
| | | | | 123/90.31 |
| 2008/0271436 A1 | * | 11/2008 | Najt | .................... F02D 13/0265 |
| | | | | 123/295 |
| 2018/0073445 A1 | * | 3/2018 | Tsuyuki | .............. F02D 13/0265 |
| 2020/0232325 A1 | | 7/2020 | Nakamura | |

FOREIGN PATENT DOCUMENTS

| | | | | |
|---|---|---|---|---|
| JP | 2019035359 A | | 3/2019 | |
| WO | WO-2014195789 A1 | * | 12/2014 | ......... F02D 13/0207 |
| WO | WO-2019035312 A1 | * | 2/2019 | .............. F01B 31/14 |

* cited by examiner

*Primary Examiner* — Erick R Solis
(74) *Attorney, Agent, or Firm* — Alleman Hall Creasman & Tuttle LLP

(57) ABSTRACT

A control system for an engine including intake and exhaust valve phase variable devices and a control device is provided. At an engine temperature below a first determination temperature, the control is performed so that an exhaust valve close timing is at or retarded from the exhaust top dead center, an intake valve open timing is retarded from the exhaust valve close timing, and the fuel supply to the combustion chamber starts in an intake stroke on a retarding side of the exhaust valve close timing. At the engine temperature above the first determination temperature and below a second determination temperature, the control is performed so that a negative overlap with both the exhaust and intake valves closed during a period including the exhaust top dead center, or a positive overlap with both the exhaust and intake valves opened during a period including the exhaust top dead center, occurs.

6 Claims, 11 Drawing Sheets

ENGINE CONTROL SYSTEM

TECHNICAL FIELD

The present disclosure relates to a control system for an engine.

BACKGROUND OF THE DISCLOSURE

Conventionally, an improvement in exhaust performance of an engine which is provided to a vehicle has been demanded. In this regard, if a catalyst device which removes exhaust gas is provided to an exhaust passage of the engine, the exhaust performance can be improved. However, when a temperature of the engine is low (e.g., at a cold start), the catalyst device has not fully been activated. Therefore, the exhaust gas may not fully be purified. Particularly, when the engine temperature is low, fuel does not fully evaporate inside the combustion chamber. Therefore, when mixing of fuel and air is insufficient, amounts of unburnt hydrocarbons (HC) and soot which are discharged from the engine body increase so that the unburnt HC and soot may be discharged without being fully purified by the catalyst device.

Regarding this problem, for example, JP2019-035359A discloses an engine in which the phase of an exhaust valve is advanced at a cold start of the engine to open the exhaust valve at a timing when the pressure inside the combustion chamber is comparatively high. This engine achieves early activation of the catalyst device by increasing the temperature of exhaust gas discharged into the exhaust passage from the engine, and increasing the flow rate of the exhaust gas.

According to the engine disclosed in JP2019-035359A, since the catalyst device is activated comparatively early after the cold start, the exhaust performance of the engine may be appropriate thereafter. However, also in this engine, the exhaust performance is not sufficient either until the catalyst device is activated. Thus, there is room for improvement in making the engine exhaust performance appropriate from immediately after the cold start.

SUMMARY OF THE DISCLOSURE

The present disclosure is made in view of the above situations, and one purpose thereof is to provide a control system for an engine, capable of making exhaust performance appropriate immediately after a cold start of the engine.

In order to solve the above-described problem, the present disclosure provides a control system for an engine provided with an engine body where a combustion chamber is formed, a fuel supply device which supplies fuel to the combustion chamber, an intake valve which opens and closes an intake port to introduce intake air into the combustion chamber, and an exhaust valve which opens and closes an exhaust port to draw exhaust gas from the combustion chamber. The control system includes an intake valve phase variable device which changes a phase of the intake valve, an exhaust valve phase variable device which changes a phase of the exhaust valve, and a control device which controls the fuel supply device, the intake valve phase variable device, and the exhaust valve phase variable device. When a first condition in which a temperature of the engine is below a given first determination temperature is satisfied, the control device controls the exhaust valve phase variable device so that a close timing of the exhaust valve is at or retarded from the exhaust top dead center, controls the intake valve phase variable device so that an open timing of the intake valve is retarded from the close timing of the exhaust valve, and controls the fuel supply device so that the fuel supply to the combustion chamber is started in an intake stroke on a retarding side of the close timing of the exhaust valve. When a second condition in which the engine temperature is above the first determination temperature and below a given second determination temperature is satisfied, the control device controls the intake valve phase variable device and the exhaust valve phase variable device so that a negative overlap in which the exhaust valve and the intake valve are both closed during a given period including the exhaust top dead center occurs, or so that a positive overlap in which the exhaust valve and the intake valve are both opened during a given period including the exhaust top dead center occurs.

According to the present disclosure, when the second condition in which the engine temperature is above the first determination temperature and below the given second determination temperature is satisfied, the exhaust valve and the intake valve are controlled so that the negative overlap in which the exhaust valve and the intake valve are both closed during the given period including the exhaust top dead center occurs, or so that the positive overlap in which the exhaust valve and the intake valve are both opened during the given period including the exhaust top dead center occurs. Thus, when the second condition is satisfied, a large amount of hot burnt gas can be trapped inside the combustion chamber to increase a temperature inside the combustion chamber, thereby stimulating the evaporation of fuel. Therefore, according to the present disclosure, amounts of unburnt HC and soot which are discharged from the combustion chamber can be reduced when the second condition is satisfied.

However, since the burnt gas is inert gas, if the large amount of burnt gas remains inside the combustion chamber as described above when the engine temperature is particularly low, the combustion may become unstable. On the other hand, in the present disclosure, when the first condition in which the engine temperature is below the first determination temperature is satisfied, the close timing of the exhaust valve is at or retarded from the exhaust top dead center, and the open timing of the intake valve is at or retarded from the close timing of the exhaust valve. Thus, the amount of burnt gas remaining inside the combustion chamber is kept low, and the combustion stability can be increased. Further, the combustion chamber is put under a high negative pressure condition in the intake stroke. According to the present disclosure, fuel is supplied to the combustion chamber under such a high negative pressure condition in the intake stroke. Thus, the evaporation of the fuel is stimulated while increasing the combustion stability, thereby keeping low the amounts of unburnt HC and soot which are discharged from the combustion chamber. Further, since the combustion chamber is in the high negative pressure condition, intake air can flow vigorously into the combustion chamber when the intake valve is opened. That is, a strong intake air flow can be formed inside the combustion chamber, which can also increase the temperature inside the combustion chamber. Therefore, the evaporation of the fuel can be stimulated certainly.

As described above, according to the present disclosure, since the amounts of unburnt HC and soot discharged to the exhaust passage from the combustion chamber can be kept law when the engine temperature is low, it can improve the exhaust performance of the engine also at a cold start of the engine during which its catalyst device is not fully activated.

In the above-described configuration, when the first condition is satisfied, the control device may control the fuel supply device so that the fuel supply to the combustion chamber is started at a timing on the retarding side of the open timing of the intake valve.

According to this configuration, the fuel is supplied to the combustion chamber where the intake air flow is formed therein and the temperature inside the combustion chamber is increased by the intake air flow. Thus, it can stimulate the evaporation of the fuel more certainly and can keep low the amounts of unburnt HC and soot discharged from the combustion chamber more certainly.

In the above-described configuration, the engine may be provided with a spark plug which ignites a mixture gas including the fuel supplied to the combustion chamber and air. The control device may control the spark plug so that an ignition timing of the spark plug is retarded more when the first condition is satisfied than when the second condition is satisfied.

When the ignition timing is set to a timing on the retarding side, a comparatively large amount of air is introduced into the combustion chamber in order to realize a demanded torque of the engine. When the large amount of air is introduced into the combustion chamber, the intake air flow therein is also increased. Thus, according to this configuration, by setting the ignition timing to a comparatively retarded timing when the first conditions is satisfied, it can increase the intake air flow inside the combustion chamber (as a result, the temperature inside the combustion chamber), thereby further stimulating the evaporation of fuel.

In the above-described configuration, the engine may be coupled to a generator which generates power by being driven by the engine. The control device may control the generator so that a power generating amount of the generator is greater when the first condition is satisfied than when the second condition is satisfied.

When the power generating amount of the generator which generates power by being driven by the engine is increased, since the engine is required to output a higher torque, a comparatively large amount of air is introduced into the combustion chamber in order to realize such a torque. When the large amount of air is introduced into the combustion chamber, the intake air flow therein is also increased. Thus, according to this configuration, by controlling the generator to achieve a comparatively higher power generating amount when the first condition is satisfied, it can increase the intake air flow inside the combustion chamber (as a result, the temperature inside the combustion chamber), thereby further stimulating the evaporation of fuel.

In the above-described configuration, when the second condition is satisfied, the control device may control the intake valve phase variable device and the exhaust valve phase variable device so that the negative overlap occurs.

According to this configuration, the open timing of the intake valve is set to a timing on the retarding side of the exhaust top dead center both when the first condition is satisfied and when the second conditions is satisfied. Thus, the amount of change in the open timing of the intake valve when the state satisfying the first condition is changed to the state satisfying the second condition (i.e., when the engine temperature exceeds the first determination temperature) can be kept low. Therefore, the open timing of the intake valve can be changed early to a suitable timing when the second condition is satisfied.

In the above-described configuration, when the second condition is satisfied and the engine temperature is above a third determination temperature above the first determination temperature, the control device may control the exhaust valve phase variable device so that the close timing of the exhaust valve is retarded more as the engine temperature increases.

According to this configuration, when the engine temperature is low and the temperature inside the combustion chamber is low, by setting the close timing of the exhaust valve to a timing on the advancing side, the amount of burnt gas remaining in the combustion chamber can be increased, thereby suitably increasing the temperature inside the combustion chamber. When the engine temperature is high and the temperature inside the combustion chamber is high, by setting the close timing of the exhaust valve to a timing on the retarding side, the amount of burnt gas remaining in the combustion chamber can be decreased, thereby preventing the temperature inside the combustion chamber from becoming excessively high.

In the above-described configuration, the control device may control the intake valve phase variable device so that the open timing of the intake valve when the first condition is satisfied is retarded from the open timing of the intake valve when the second condition is satisfied.

According to this configuration, since the open timing of the intake valve when the first condition is satisfied is retarded sufficiently, the effect of the negative pressure described above is increased, thereby stimulating the evaporation of fuel more certainly.

BRIEF DESCRIPTION OF DRAWINGS

FIG. 10A is a view illustrating a situation inside a combustion chamber before exhaust TDC, FIG. 10B is a view illustrating a situation inside the combustion chamber after the exhaust TDC and before an open timing of the intake valve, and FIG. 10C is a view illustrating a situation inside the combustion chamber after the open timing of the intake valve.

DETAILED DESCRIPTION OF THE DISCLOSURE

Overall Configuration of Vehicle

Figure 1:
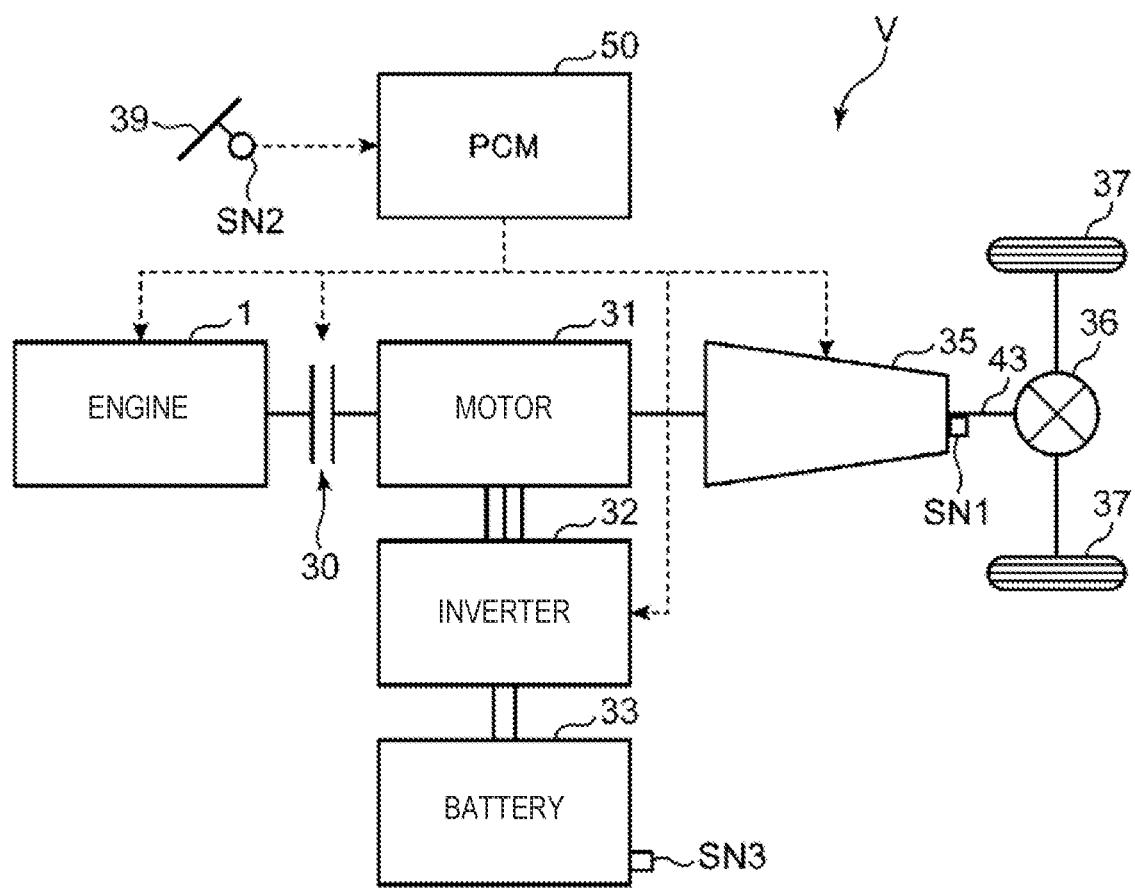
FIG. 1 is a system chart illustrating an outline configuration of a vehicle to which a control system for an engine according to one embodiment of the present disclosure is applied.

FIG. 1 is a system chart illustrating an outline configuration of a vehicle V to which a control system for an engine according to one embodiment of the present disclosure is applied. As illustrated in this drawing, the vehicle V includes an engine 1, a clutch 30, a motor 31, an inverter 32, a battery 33, a transmission 35, a differential gear 36, driving wheels 37, and a powertrain control module (PCM) 50. Each of the engine 1 and the motor 31 is capable of driving the driving wheels 37 as a power source for the vehicle to travel. That is, the vehicle V in this embodiment is a hybrid vehicle which uses both the engine 1 and the motor 31 as power sources. The PCM 50 is an example of a "control device" of the present disclosure.

The engine 1 is a four-cycle internal combustion engine which generates output by combustion of fuel. Although the fuel of the engine 1 is not limited in particular, a gasoline engine which uses gasoline as the fuel is used as the engine 1 in this embodiment. The details of the engine 1 will be described later.

The motor 31 is a motor generator which is provided with a combination of functions as a motor and a generator. For example, a three-phase alternate-current synchronous electric motor is used as the motor 31. The motor 31 operates as a motor when the vehicle V accelerates to generate a driving force for rotating the driving wheels 37. Further, the motor 31 operates as a generator when the vehicle V slows down to generate electric power in response to a rotational force transmitted from the driving wheels 37. Note that when the motor 31 operates as the generator, a braking force (regeneration brake) according to the power generating amount by the motor 31 acts on the driving wheels 37.

The inverter 32 is a converter which performs a conversion from alternate-current power to direct-current power, and vice versa. When the motor 31 operates as the generator, the inverter 32 converts alternate-current power generated by the motor 31 into direct-current power, and then supplies it to the battery 33. On the other hand, when the motor 31 operates as the motor, the inverter 32 converts the direct-current power stored in the battery 33 into alternate-current power, and then supplies it to the motor 31. The inverter 32 also has a function to adjust the output or the power generating amount of the motor 31 through the electric power transfer control between the motor 31 and the battery 33.

The battery 33 is a secondary cell which is chargeable and dischargeable. For example, a lithium-ion battery or a nickel-hydrogen battery is used as the battery 33. The battery 33 supplies driving power to the motor 31 via the inverter 32, and accepts and stores electric power generated by the motor 31 via the inverter 32.

A battery sensor SN3 for detecting input/output current from/to the battery 33 is attached to the battery 33. The current value detected by the battery sensor SN3 is used for identifying a battery state of charge (SOC) (i.e., a ratio of a present charged amount over a charged amount when the battery 33 is fully charged). In other words, the battery sensor SN3 is a sensor for detecting the battery SOC. Concretely, the PCM 50 calculates a charged amount and a discharged amount per unit time of the battery 33 based on a detection value of the battery sensor SN3, and calculates the battery SOC by integrating these amounts.

The clutch 30 is a clutch which couples the engine 1 to the motor 31 so as to be engageable and disengageable. Concretely, the clutch 30 couples (engages) an output shaft (a crankshaft 7 described later) of the engine 1 to a rotation shaft (rotor shaft) of the motor 31 in series, or decouples (disengages) the output shaft from the rotation shaft. When the clutch 30 is engaged so that the engine 1 is coupled to the motor 31, the torques of both the engine 1 and the motor 31 are transmitted to the driving wheels 37 via the transmission 35 and the differential gear 36. On the other hand, when the clutch 30 is disengaged, the engine 1 is cut off from the motor 31 so that only the torque of the motor 31 is transmitted to the driving wheels 37.

The transmission 35 changes the speed of the rotation inputted from the engine 1 and the motor 31, and outputs it to the differential gear 36. In this embodiment, the transmission 35 is an automatic transmission in which a gear ratio (gear stage) is automatically changed according to a vehicle traveling speed and an engine speed. The differential gear 36 distributes the rotation inputted from the transmission 35 to the left-and-right driving wheels 37.

A vehicle speed sensor SN1 for identifying a traveling speed of the vehicle V (i.e., a vehicle speed) is attached to the transmission 35. Concretely, the vehicle speed sensor SN1 detects a rotational speed of an output shaft 43 of the transmission 35, and the vehicle speed is identified based on this detection value.

The vehicle V is provided with an accelerator pedal 39 which is stepped on by a vehicle driver. An accelerator sensor SN2 for detecting an accelerator opening indicative of a degree of a stepped-on or depressing amount is attached to the accelerator pedal 39.

The PCM 50 is a control device which is mainly comprised of a microcomputer including a processor (e.g., a central processing unit (CPU)) which performs calculation, memory such as ROM and RAM, and various kinds of input/output buses. The PCM 50 comprehensively controls the engine 1, the motor 31, and the transmission 35. Concretely, the PCM 50 controls the output of the engine 1 and controls the output of the motor 31 through the inverter 32, and further controls the gear stage of the transmission 35, so that a suitable driving force according to a traveling condition of the vehicle V is transmitted to the driving wheels 37.

Engine Structure

Figure 2:
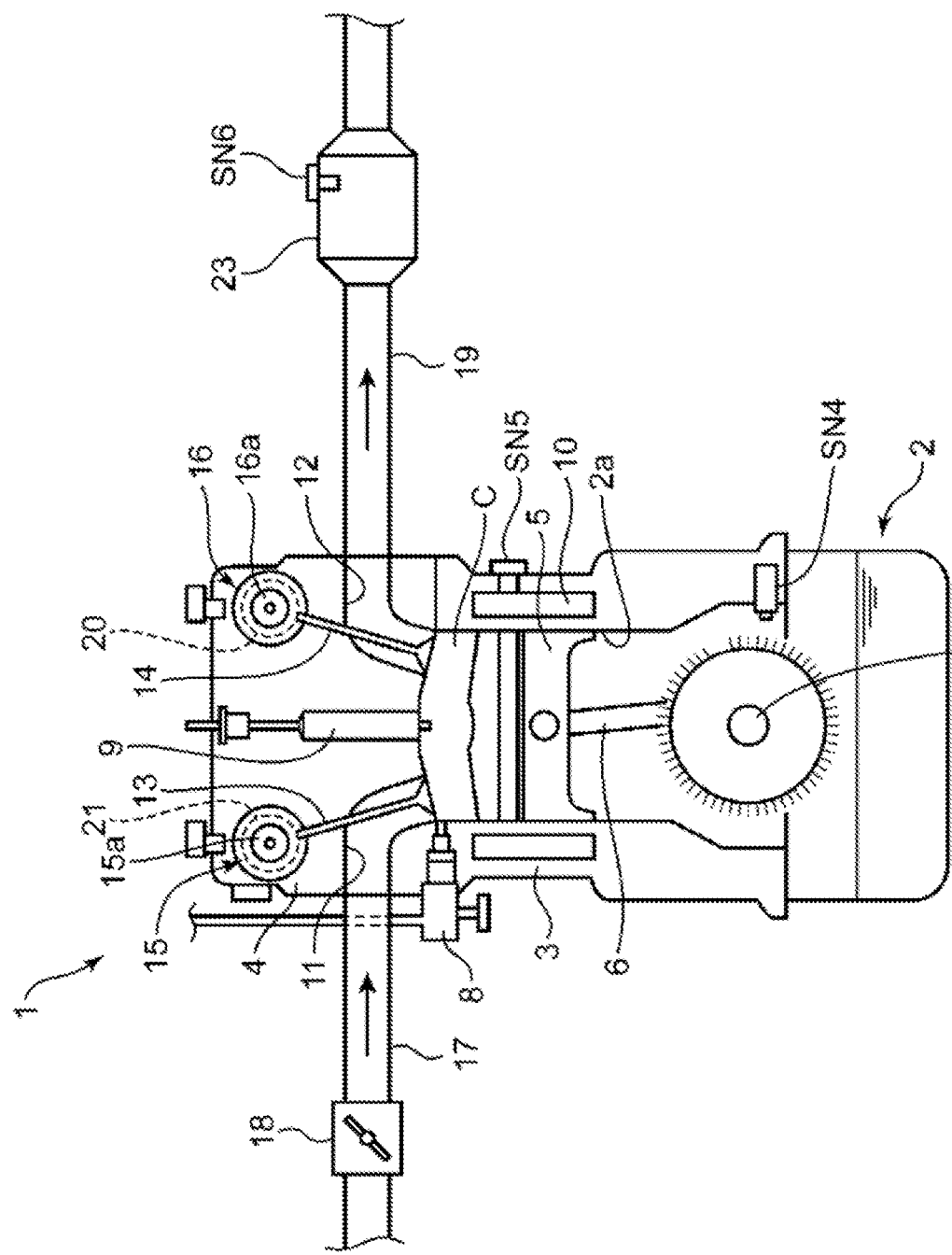
FIG. 2 is an outline cross-sectional view illustrating a structure of the engine.

FIG. 2 is an outline cross-sectional view illustrating a structure of the engine 1. The engine 1 includes an engine body 2, an intake passage 17, and an exhaust passage 19.

The engine body 2 is of a multi-cylinder type having a plurality of cylinders 2a which are lined up in a direction perpendicular to the drawing sheet of FIG. 2, for example. That is, the engine body 2 includes a cylinder block 3 and a cylinder head 4 which form a plurality of the cylinders 2a therein, and a plurality of pistons 5 reciprocatably accommodated in the respective cylinders 2a.

A combustion chamber C is formed above the piston 5 of each cylinder 2a. Each combustion chamber C is a space formed by a lower surface of the cylinder head 4, a side circumferential surface of the cylinder 2a (cylinder liner), and an upper surface of the piston 5 (crown surface). Fuel injected from an injector 8 (described later) is supplied to the combustion chamber C. The piston 5 reciprocates in the up-and-down direction in response to expansion energy (combustion energy) caused by combustion of fuel supplied to the combustion chamber C.

The crankshaft 7 is disposed below the pistons 5. The crankshaft 7 is the output shaft of the engine 1 (or the engine body 2), and is rotatably supported by a lower part of the cylinder block 3. The crankshaft 7 is coupled to the piston 5 of each cylinder 2a via a crank mechanism including a connecting rod 6, and rotates on the center axis according to the reciprocating movement (up-and-down motion) of the piston 5.

A crank angle sensor SN4 is attached to the cylinder block 3. The crank angle sensor SN4 is a sensor for detecting a crank angle which is a rotation angle of the crankshaft 7, and an engine speed which is a rotational speed of the crankshaft 7. An engine water temperature sensor SN5 for detecting an engine water temperature which is a temperature of cooling water (coolant) for cooling the engine body 2 is attached to the cylinder block 3. Concretely, a water jacket 10 where the coolant circulates is formed in the cylinder block 3 and the cylinder head 4, and the engine water temperature sensor SN5 detects the temperature of the coolant which circulates through the water jacket 10.

The injector 8 and a spark plug 9 are attached to the cylinder head 4. The injector 8 is an injection valve which injects fuel into the combustion chamber C of each cylinder 2a. The spark plug 9 is a plug which ignites a mixture gas comprised of fuel injected into the combustion chamber C from the injector 8 and air. One injector 8 and one spark plug 9 are provided for each cylinder 2a. The injector 8 is an example of a "fuel supply device" in the present disclosure.

Intake ports 11 and exhaust ports 12 are formed in the cylinder head 4. The intake port 11 is a port which communicates the combustion chamber C of each cylinder 2a with the intake passage 17. The exhaust port 12 is a port which communicates the combustion chamber C of each cylinder 2a with the exhaust passage 19. An intake valve 13 is provided to the intake port 11 of each cylinder 2a, and an exhaust valve 14 is provided to the exhaust port 12 of each cylinder 2a.

The cylinder head 4 is provided with an intake valve operating mechanism 15 and an exhaust valve operating mechanism 16. The intake valve operating mechanism 15 includes an intake cam shaft 15a disposed above the intake valves 13, and the exhaust valve operating mechanism 16 includes an exhaust cam shaft 16a disposed above the exhaust valves 14. The intake cam shaft 15a, the exhaust cam shaft 16a, and the crankshaft 7 are coupled to each other via a power transmission mechanism including, for example, a chain. That is, the intake valve operating mechanism 15 and the exhaust valve operating mechanism 16 open and close the intake valve 13 and the exhaust valve 14 of each cylinder 2a in an interlocked manner with the rotation of the crankshaft 7. The intake valve 13 periodically opens and closes an opening of the intake port 11 on the combustion chamber C side according to the intake valve operating mechanism 15 being driven, and the exhaust valve 14 periodically opens and closes an opening of the exhaust port 12 on the combustion chamber C side according to the exhaust valve operating mechanism 16 being driven.

The exhaust valve operating mechanism 16 is provided with an exhaust SVT 20, and the intake valve operating mechanism 15 is provided with an intake SVT 21. The exhaust SVT 20 is a device which changes the phase (opening-and-closing timing) of the exhaust valve 14 by changing the rotation phase of the exhaust cam shaft 16a with respect to the rotation phase of the crankshaft 7. The intake SVT 21 is a device which changes the phase (opening-and-closing timing) of the intake valve 13 by changing the rotation phase of the intake cam shaft 15a with respect to the rotation phase of the crankshaft 7.

The exhaust SVT 20 in this embodiment is a variable device which changes the phase of the exhaust valve 14 while maintaining a lift amount and an opening period of the exhaust valve 14 (in other words, changes an open timing (valve-opening start timing) EVO and a close timing (valve close timing) EVC of the exhaust valve 14 by the same amounts). Similarly, the intake SVT 21 is a variable device which changes the phase of the intake valve 13 while maintaining a lift amount and an opening period of the intake valve 13 (in other words, changes an open timing (valve-opening start timing) IVO and a close timing (valve close timing) IVC of the intake valve 13 by the same amounts). Note that the exhaust cam shaft 16a (intake cam shaft 15a) of which the phase is changed by the exhaust SVT 20 (intake SVT 21) is a common cam shaft for all the cylinders 2a. In other words, the exhaust SVT 20 (intake SVT 21) collectively changes the phases (opening-and-closing timings) of the exhaust valves 14 (intake valves 13) of the cylinders 2a by changing the rotation phase of the exhaust cam shaft 16a (intake cam shaft 15a). Further, the exhaust SVT 20 (intake SVT 21) in this embodiment is hydraulically driven so that it changes the rotation phase of the exhaust cam shaft 16a (intake cam shaft 15a) by changing hydraulic pressure. The exhaust SVT 20 is an example of an "exhaust valve phase variable device" in the present disclosure, and the intake SVT 21 is an example of an "intake valve phase variable device" in the present disclosure.

The intake passage 17 is a tubular passage for introducing intake air into the combustion chamber C of each cylinder 2a. The intake passage 17 is connected with the engine body 2 so as to communicate with the combustion chamber C of each cylinder 2a via the intake port 11. A throttle valve 18 which adjusts a flow rate of intake air which circulates therein and is able to open and close is provided to the intake passage 17.

The exhaust passage 19 is a tubular passage which discharges exhaust gas discharged from the combustion chamber C of each cylinder 2a to the outside. The exhaust passage 19 is connected with the engine body 2 so as to communicate with the combustion chamber C of each cylinder 2a via the exhaust port 12. A catalyst device 23 which removes hazardous components in exhaust gas is provided to the exhaust passage 19. The catalyst device 23 includes a three-way catalyst, for example. A catalyst temperature sensor SN6 for detecting a catalyst temperature which is a temperature inside the catalyst device 23 is attached to the catalyst device 23.

Control System

Figure 3:
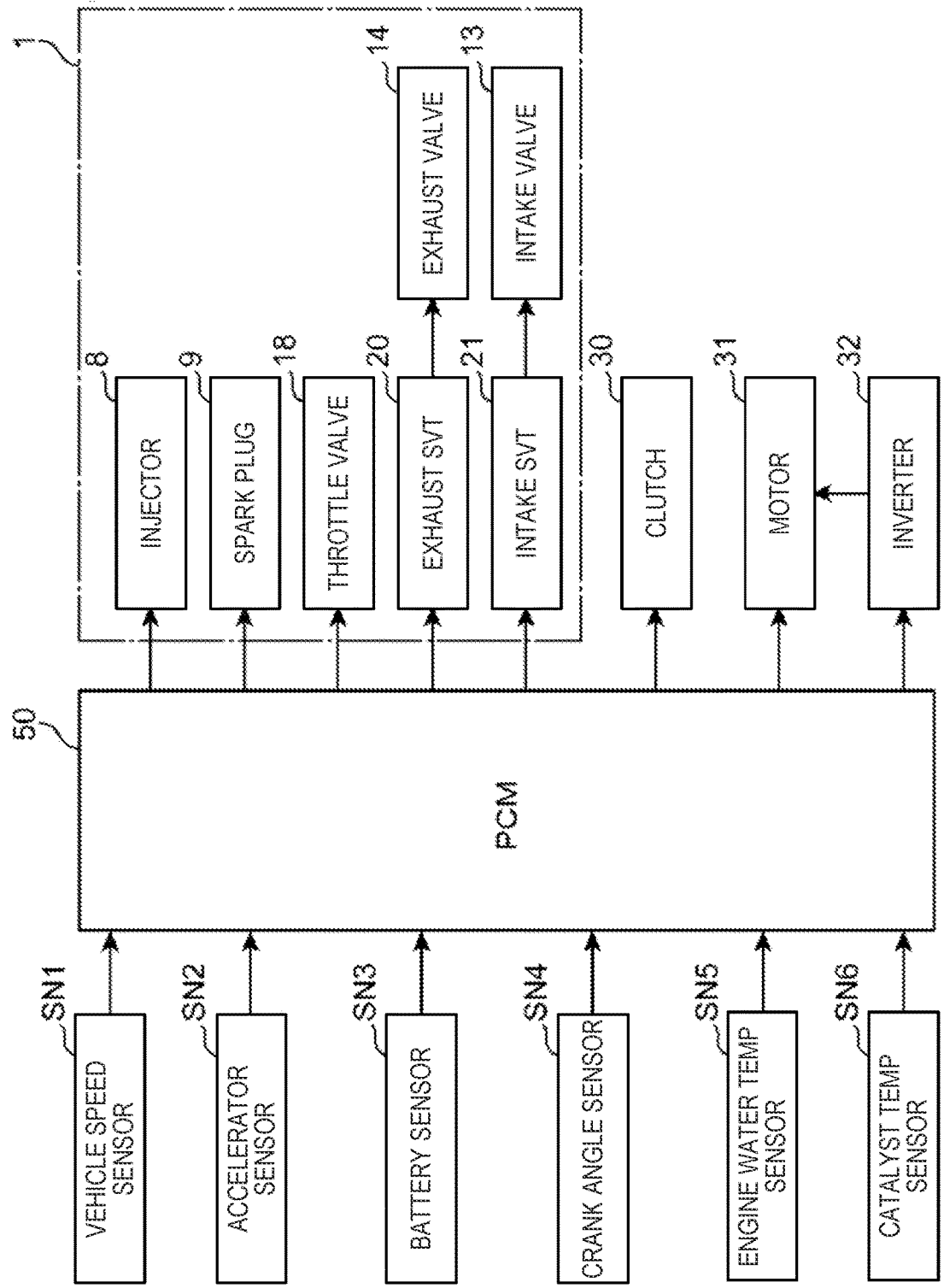
FIG. 3 is a functional block diagram illustrating a control system of the vehicle.

FIG. 3 is a functional block diagram illustrating a control system of the vehicle V. As illustrated in the drawing, the PCM 50 is electrically connected to the vehicle speed sensor SN1, the accelerator sensor SN2, the battery sensor SN3, the crank angle sensor SN4, the engine water temperature sensor SN5, and the catalyst temperature sensor SN6, which are described above. Information detected by each sensor (i.e., information equivalent to the vehicle speed, the accelerator opening, the battery SOC, the crank angle, the engine speed, the engine water temperature, and the catalyst temperature) is inputted into the PCM 50 in turn.

The PCM 50 controls traveling of the vehicle V based on the input information from the sensors SN1-SN6. That is, the PCM 50 is electrically connected to the injector 8, the spark plug 9, the throttle valve 18, the exhaust SVT 20, and the intake SVT 21 of the engine 1, which are described above, and is also electrically connected to the clutch 30, the motor 31, and the inverter 32, which are described above. The PCM 50 outputs, to each of these apparatuses, a control signal generated through calculation based on the input information from the sensors SN1-SN6. Note that regarding the control of the exhaust SVT 20 (intake SVT 21), the PCM 50 indirectly controls the exhaust SVT 20 by controlling a hydraulic circuit device which performs hydraulic pressure supply of the exhaust SVT 20 (intake SVT 21).

For example, the PCM 50 calculates a demanded torque of the vehicle V which is a torque to be transmitted to the driving wheels 37 each time, based on the vehicle speed detected by the vehicle speed sensor SN1 and the accelerator opening detected by the accelerator sensor SN2, and controls the engine 1, the clutch 30, and the motor 31 (inverter 32) while determining a traveling mode of the vehicle V, based on the calculated demanded torque and the battery SOC detected by the battery sensor SN3.

Concretely, when the demanded torque of the vehicle V is comparatively low and the battery SOC is comparatively high, a motor traveling mode is selected. In this case, the PCM 50 stops the engine 1 and disengages the clutch 30. Further, the PCM 50 makes the vehicle V travel only by the motor 31 by causing the motor 31 to generate a torque equivalent to the demanded torque of the vehicle V. On the other hand, when the demanded torque of the vehicle V is comparatively high or the battery SOC is comparatively low, an engine traveling mode is selected. In this case, the PCM 50 drives the engine 1 (causes it to perform combustion), and engages the clutch 30. Further, the PCM 50 drives the motor 31, for example, when the output torque of the engine 1 is insufficient for the demanded torque of the vehicle V, and it causes the motor 31 to generate an assist torque equivalent to the torque insufficiency. In this case, the PCM 50 controls the engine 1 and the motor 31 so that the sum total of the torques of the engine 1 and the motor 31 is equivalent to the demanded torque of the vehicle V. On the other hand, when the motor 31 is not activated, the PCM 50 makes the vehicle V travel only with the engine 1 by causing the engine 1 to generate the torque equivalent to the demanded torque of the vehicle V.

Figure 4:
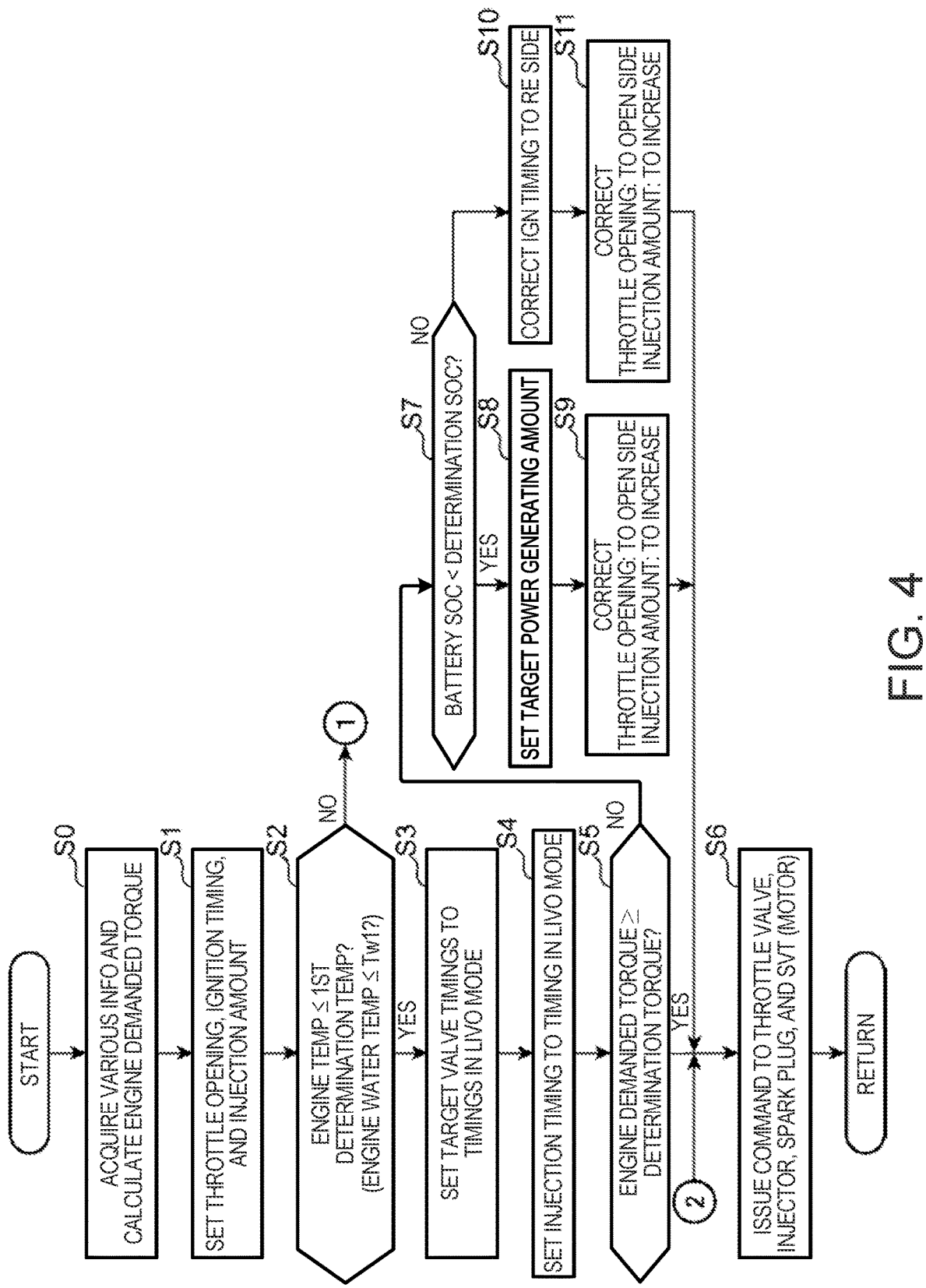
FIG. 4 is a flowchart illustrating a part of a control of the vehicle.
Figure 5:
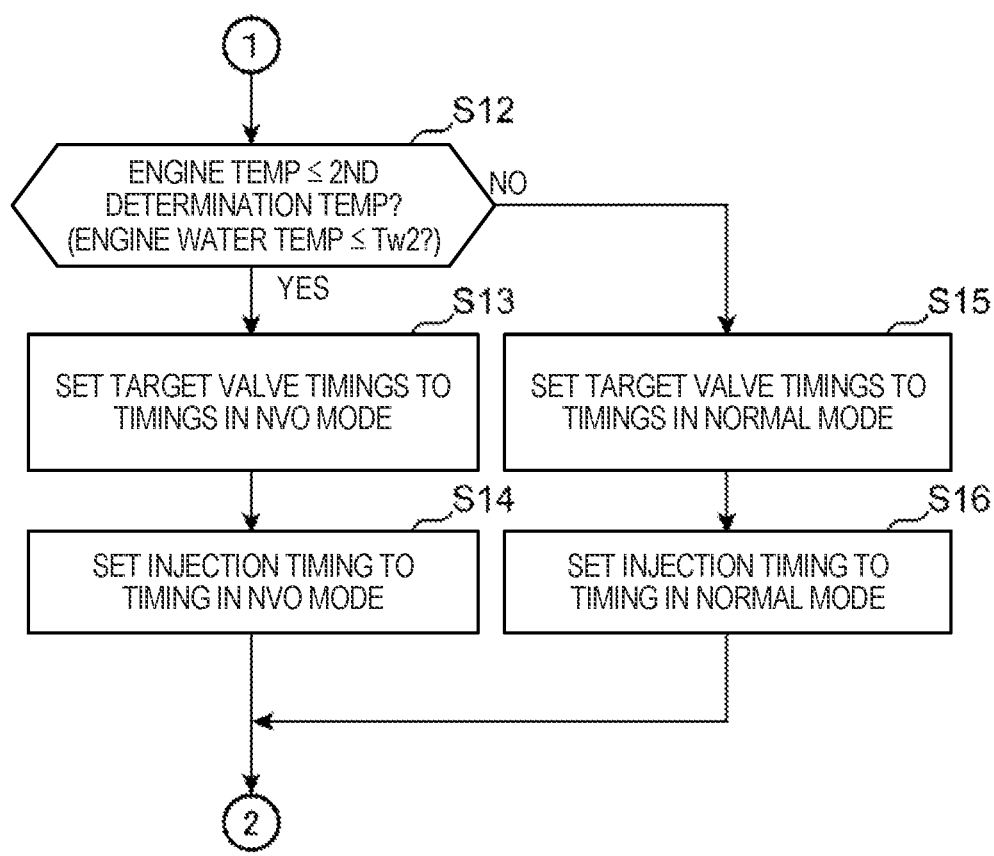
FIG. 5 is a flowchart illustrating a part of the control of the vehicle.

Next, the details of a control of the vehicle V when the engine temperature is low, which is a characteristic control of the present disclosure, are described using flowcharts of FIGS. 4 and 5. The control illustrated in these drawings is performed during traveling in the engine traveling mode.

When the control illustrated in FIG. 4 starts, the PCM 50 acquires various information related to the traveling state of the vehicle V, and calculates an engine demanded torque (Step S0). The PCM 50 acquires at least the detection values of the sensors SN1-SN6 described above (i.e., the vehicle speed, the accelerator opening, the battery SOC, the engine speed, the engine water temperature, and the catalyst temperature). Further, the PCM 50 calculates the engine demanded torque which is a torque demanded for the engine 1, based on the demanded torque of the vehicle V calculated based on the vehicle speed and the accelerator opening as described above.

Next, the PCM 50 sets a throttle opening which is the opening of the throttle valve 18, an ignition timing which is a timing when the spark plug 9 performs ignition, and an injection amount which is an amount of fuel injected from the injector 8 so that the engine demanded torque calculated at Step S0 is realized (Step S1).

At this time, the PCM 50 sets the throttle opening and the injection amount so that an excess air ratio $\lambda$, of the mixture gas formed inside the combustion chamber C is set to 1.

Note that the excess air ratio $\lambda$, is a value obtained by dividing the air-fuel ratio of the mixture gas by a stoichiometric air fuel ratio.

For example, the PCM 50 extracts values corresponding to the present engine speed and the engine demanded torque from maps of the throttle opening, the ignition timing, and the injection amount which are set beforehand and stored for the engine speed and the engine demanded torque, and sets the extracted values as the throttle opening, the ignition timing, and the injection amount, respectively.

Next, the PCM 50 determines whether the temperature of the engine 1 is below a given first determination temperature (Step S2). In this embodiment, at this Step S2, the PCM 50 determines whether the engine water temperature detected by the engine water temperature sensor SN5 is below a given first determination water temperature Tw1. The first determination water temperature Tw1 is set beforehand and stored in the PCM 50. Concretely, the first determination water temperature Tw1 is set to a temperature comparable to a maximum temperature of the engine water temperature when the engine 1 is in a cold state and the catalyst device 23 in an inactive state (for example, it is set to about 20° C.). Thus, in this embodiment, the engine water temperature (the temperature of the engine coolant) is an example of a "temperature of the engine" in the present disclosure, and the first determination water temperature is an example of a "first determination temperature" in the present disclosure. Further, the condition of the engine water temperature being below the first determination water temperature Tw1 is an example of a "first condition" in the present disclosure, and the state in which the engine water temperature is below the first determination water temperature Tw1 is an example of "when the first condition is satisfied."

If the determination of Step S2 is YES, where the engine water temperature is below the first determination water temperature Tw1 (if the temperature of the engine 1 is below the first determination temperature), the PCM 50 sets a target intake valve timing which is a target value of the opening-and-closing timing of the intake valve 13 (the open timing IVO and the close timing IVC), and a target exhaust valve timing which is a target value of the opening-and-closing timing of the exhaust valve 14 (the open timing EVO and the close timing EVC), to valve timings in an LIVO mode (Step S3).

Figure 6:
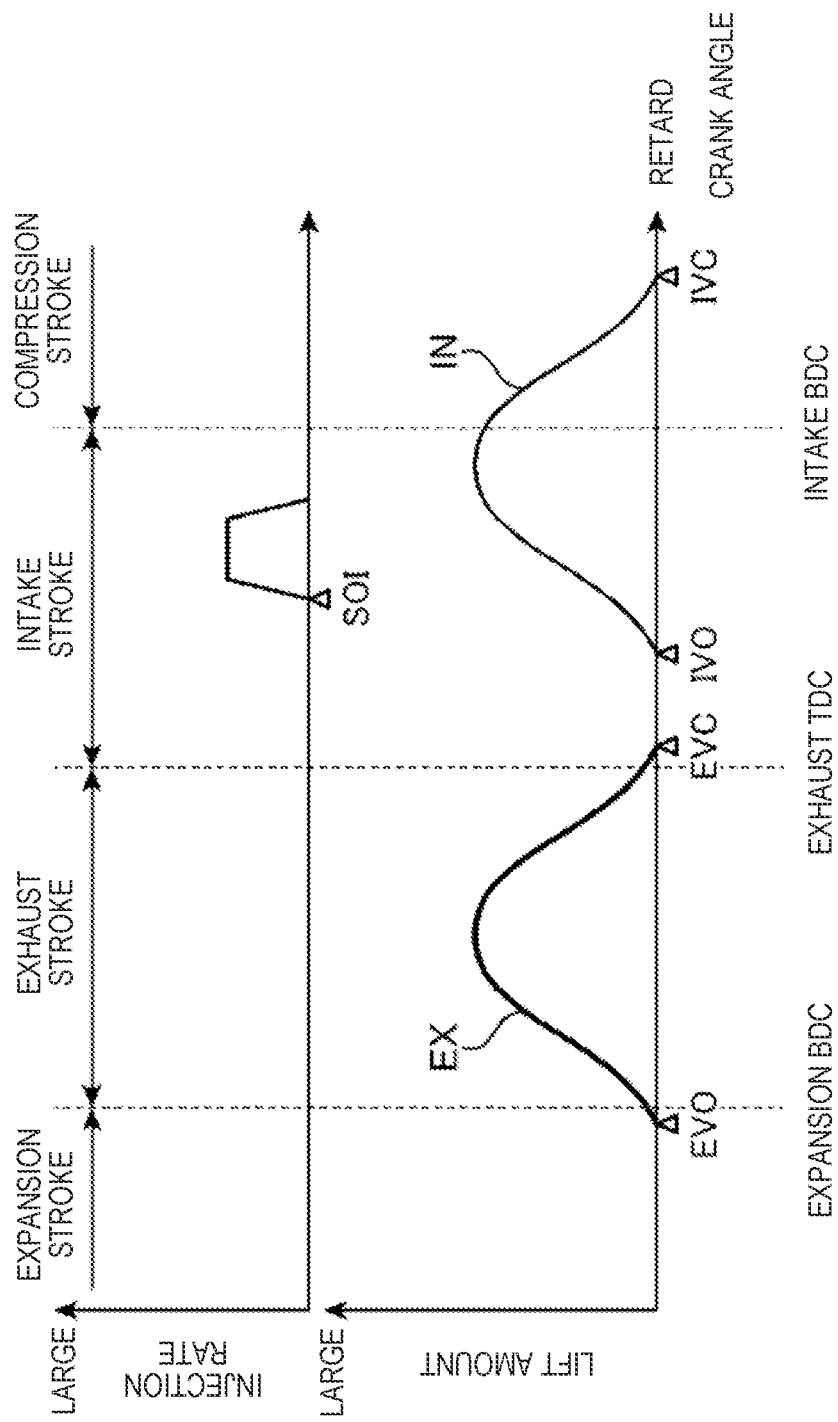
FIG. 6 is a view illustrating one example of valve lifts of an intake valve and an exhaust valve in a late intake valve opening (LIVO) mode.

As illustrated in FIG. 6, the valve timings in the LIVO mode are valve timings at which the exhaust valve 14 is closed after exhaust TDC (exhaust top dead center), and the intake valve 13 is opened in the subsequent intake stroke. Thus, at Step S3, the PCM 50 sets a valve timing at which the close timing EVC of the exhaust valve 14 is a timing at the exhaust TDC or a timing on the retarding side of the exhaust TDC, as the target exhaust valve timing. Further, at Step S3, the PCM 50 sets a valve timing at which the open timing IVO of the intake valve 13 is a timing during in an intake stroke and on the retarding side of the close timing EVC of the exhaust valve 14, as the target intake valve timing.

At Step S3, the PCM 50 sets the valve timings which satisfy the above-described condition based on the engine speed and the engine demanded torque calculated at Step S0, as an intake target valve timing and an exhaust target valve timing. For example, the PCM 50 extracts values corresponding to the present engine speed and the engine demanded torque from maps of the target intake valve timing and the target exhaust valve timing for a late intake valve opening (LIVO) mode, which are set beforehand and stored so as to satisfy the above-described condition for the engine speed and the engine demanded torque, and sets the extracted values as the target intake valve timing and the target exhaust valve timing, respectively.

In this embodiment, the target intake valve timing in the LIVO mode is retarded from a target intake valve timing in a no valve opening (NVO) mode (described later). That is, the open timing IVO of the intake valve 13 in the LIVO mode is retarded from the open timing IVO of the intake valve 13 in the NVO mode set at Step S13 described later. In detail, the open timing IVO of the intake valve 13 in the LIVO mode is retarded from the open timing IVO of the intake valve 13 in the NVO mode, under the condition with the same engine speed and the engine demanded torque.

Next, the PCM 50 sets the injection timing which is a timing at which the injector 8 starts injection of fuel to a timing in the LIVO mode (Step S4). As illustrated in FIG. 6, the injection timing (SOI) in the LIVO mode is set to a timing during an intake stroke on the retarding side of the close timing EVC of the exhaust valve 14 and the open timing IVO of the intake valve 13.

Further, in this embodiment, the injection timing in the LIVO mode is set about 30° C.A (crank angle) on the retarding side of the open timing IVO of the intake valve 13, and about 20° C.A on the retarding side of the timing at which the pressure inside the combustion chamber C becomes the minimum.

For example, the PCM 50 extracts a value corresponding to the present engine speed and the engine demanded torque from a map of the injection timing in the LIVO mode which is set and stored beforehand so as to satisfy the above-described condition for the engine speed and the engine demanded torque, and sets the extracted value as the injection timing.

Next, the PCM 50 determines whether the engine demanded torque calculated at Step S0 is above a given determination torque (Step S5). The determination torque is set beforehand to a value larger than 0 and smaller than a maximum value of the engine demanded torque, and is stored in the PCM 50. In detail, the determination torque is set to the minimum value of the engine demanded torque so that, even if the throttle opening is increased from the opening set at Step S1 by a given amount in a state where the close timing IVC of the intake valve 13 is the timing set at Step S3, an amount of increase in the engine torque with respect to the engine demanded torque calculated at Step S0 is suppressed below a given value.

If the determination of Step S5 is YES, where the engine demanded torque is above the determination torque, the PCM 50 issues a command to the throttle valve 18 (the device which opens and closes the throttle valve 18), the injector 8, and the spark plug 9 so that the throttle opening, the ignition timing, and the injection amount which are set at Step S1, and the injection timing set at Step S4 are realized (Step S6). Further, the PCM 50 issues a command to the intake SVT 21 and the exhaust SVT 20 so that each target valve timing set at Step S3 is realized (Step S6), and ends this processing (returns to Step S1). Note that in this embodiment, the drive of the motor 31 as a generator is stopped at Step S6 to which the processing proceeds to when the determinations of Steps S2 and S5 are YES.

On the other hand, if the determination of Step S5 is NO, where the engine demanded torque is below the determination torque, the PCM 50 determines whether the battery SOC acquired at Step S0 is below a given determination SOC (Step S7). The determination SOC is set beforehand as a value larger than 0% and smaller than 100%, and is stored in the PCM 50.

If the determination of Step S7 is YES, where the battery SOC is below the determination SOC, the PCM 50 sets a target power generating amount which is a target value of the power generating amount of the motor 31 (Step S8). In this embodiment, the PCM 50 sets the target power generating amount based on the battery SOC and the engine demanded torque calculated at Step S0. Concretely, the target power generating amount is set so that it becomes smaller as the battery SOC and the engine demanded torque increase.

Next, the PCM 50 corrects the throttle opening set at Step S1 to an opening side (Step S9). That is, an opening larger than the opening set at Step S1 is reset as the throttle opening so that a larger amount of air than the amount of air introduced into the combustion chamber C at the throttle opening set at Step S1 is introduced into the combustion chamber C. Further, the PCM 50 corrects the injection amount set at Step S1 so as to increase it (Step S9). That is, a larger amount than the injection amount set at Step S1 is reset as the injection amount.

At Step S9, the throttle opening and the injection amount are reset so that the engine torque generated when the throttle opening and the injection amount which are reset are realized coincides with the sum total torque of the engine torque required for causing the motor 31 to generate the target power generating amount set at Step S8 and the engine demanded torque calculated at Step S0, and the excess air ratio $\lambda$, of the mixture gas inside the combustion chamber C becomes 1, when the throttle opening and the injection amount which are reset are realized. Thus, the correction amounts of the throttle opening and the injection amount (increased parts with respect to the throttle opening and the injection amount which are set at Step S1) increases as the target power generating amount increases.

Next, the PCM 50 issues a command to the spark plug 9 so that the ignition timing set at Step S1 is realized (Step S6). Further, the PCM 50 issues a command to the intake SVT 21 and the exhaust SVT 20 so that the target valve timings set at Step S3 are realized, respectively (Step S6). Further, at Step S6 to which the processing proceeds to if the determination of Step S7 is YES, the PCM 50 issues a command to the throttle valve 18 and the injector 8 so that the throttle opening and the injection amount which are set at Step S9 are realized, and the injection timing which is set at Step S4 is realized (Step S6). Further, at Step S6 to which the processing proceeds to if the determination of Step S7 is YES, the PCM 50 issues a command to the motor 31 (inverter 32) so that the motor 31 operates as a generator and its power generating amount becomes the target power generating amount which is set at Step S8 (Step S6), and ends the processing (returns to Step S1). Note that in this embodiment, the electric power generated by the motor 31 is fed to the battery 33, and is stored in the battery 33.

Returning to Step S7, if the determination of Step S7 is NO, where the battery SOC is more than the determination SOC, the PCM 50 corrects the ignition timing set at Step S1 to a timing on the retarding side (Step S10). That is, it resets the timing on the retarding side of the ignition timing set at Step S1, as the ignition timing. At Step S10, the ignition timing is reset based on the engine demanded torque calculated at Step S0. Concretely, the ignition timing is reset so that the retarding amount of the ignition timing (a retarding amount with respect to the ignition timing set at Step S1) decreases as the engine demanded torque increases.

Next, the PCM 50 corrects the throttle opening set at Step S1 to the opening side (Step S11). That is, an opening larger than the opening set at Step S1 is reset as the throttle opening so that a larger amount of air than the amount of air introduced into the combustion chamber C at the throttle opening set at Step S1 is introduced into the combustion chamber C. Further, the PCM 50 corrects the injection amount set at Step S1 so as to increase it (Step S11). That is, a larger amount than the injection amount at Step S1 is reset as the injection amount.

At Step S11, the throttle opening and the injection amount are reset so that the throttle opening and the injection amount which are reset at Step S11 are realized, the engine torque generated when the ignition timing reset at Step S10 is realized coincides with the engine demanded torque calculated at Step S1, and the excess air ratio λ, of the mixture gas inside the combustion chamber C when the throttle opening and the injection amount which are reset are realized becomes 1. Thus, the correction amounts of the throttle opening and the injection amount (the increased parts with respect to the throttle opening and the injection amount which are set at Step S1) are increased as the retarding amount of the ignition timing (the retarding amount from the ignition timing set at Step S1) increases.

Next, the PCM 50 issues a command to the injector 8 so that the injection timing set at Step S4 is realized (Step S6). Further, the PCM 50 issues a command to the intake SVT 21 and the exhaust SVT 20 so that the target valve timings set at Step S3 are realized (Step S6). Further, at Step S6 to which the processing proceeds to if the determination of Step S7 is NO, the PCM 50 issues a command to the throttle valve 18 and the injector 8 so that the throttle opening and the injection amount which are set at Step S1*l* are realized (Step S6). Further, at Step S6 to which the processing proceeds to if the determination of Step S7 is NO, the PCM 50 issues a command to the spark plug 9 so that the ignition timing set at Step S10 is realized (Step S6), and ends this processing (returns to Step S1). Note that in this embodiment, at Step S6 to which the processing proceeds to if the determination of Step S2 is YES and the determinations of Steps S5 and S7 are NO, the drive of the motor 31 as a generator is stopped.

Returning to Step S2, if the determination of Step S2 is NO, where the engine water temperature is above the first determination water temperature Tw1 (if the temperature of the engine 1 is above the first determination temperature), the PCM 50 determines whether the temperature of the engine 1 is below a given second determination temperature which is above the first determination temperature (Step S12). In this embodiment, at this Step S12, the PCM 50 determines whether the engine water temperature detected by the engine water temperature sensor SN5 is below a given second determination water temperature Tw2. Thus, in this embodiment, the second determination water temperature Tw2 corresponds to a "second determination temperature" in the present disclosure. Further, the condition of the engine water temperature being above the first determination water temperature Tw1 and below the second determination water temperature Tw2 is an example of a "second condition" in the present disclosure, and the state in which the engine water temperature is above the first determination water temperature Tw1 and below the second determination water temperature Tw2 is an example of "when the second condition is satisfied" in the present disclosure.

The second determination water temperature Tw2 is set beforehand as a value above the first determination water temperature Tw1, and is stored in the PCM 50. The second determination water temperature Tw2 is set to a temperature comparable to a maximum temperature of the engine water temperature before a warm-up of the engine 1 is finished (in a so-called "half warm-up state"), when the catalyst device 23 is in the active state (for example, it is set to about 60° C.).

Figure 7:
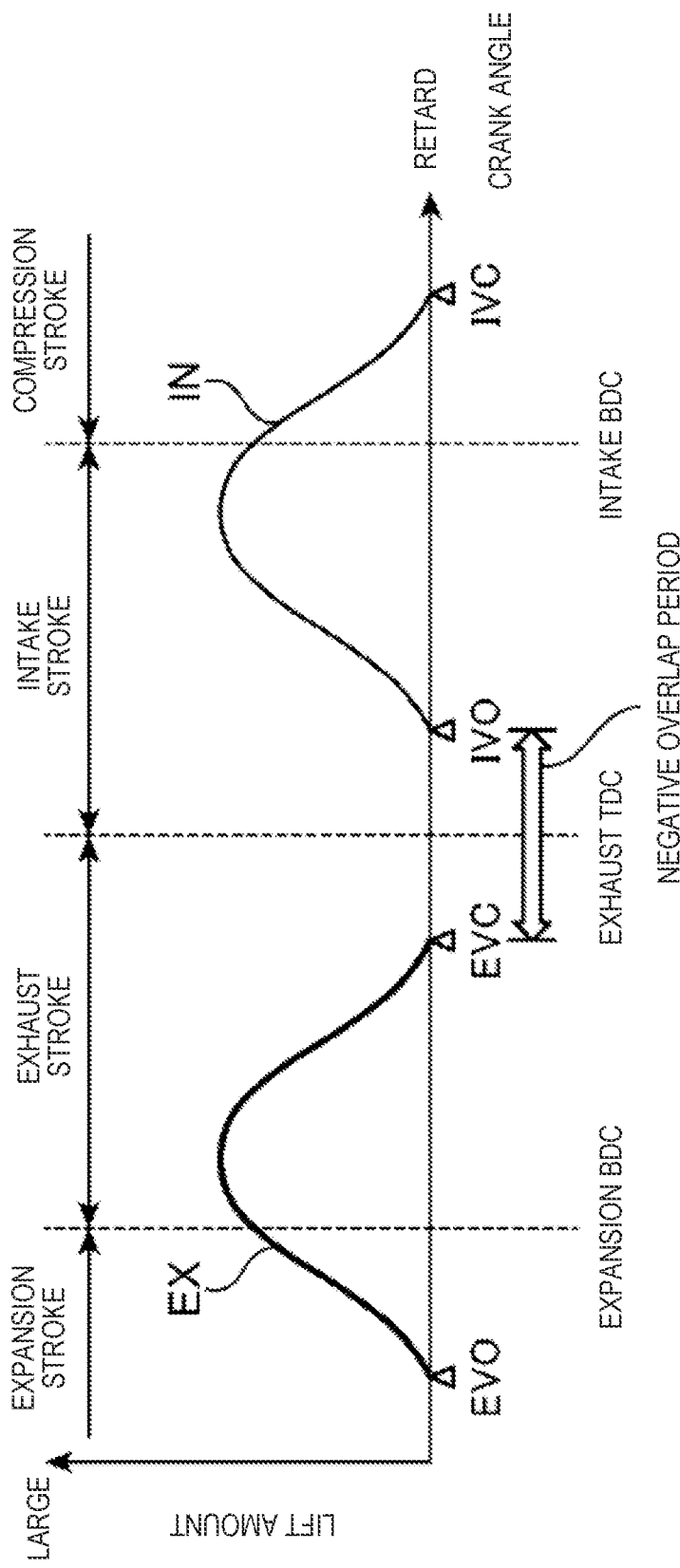
FIG. 7 is a view illustrating one example of the valve lifts of the intake valve and the exhaust valve in a no valve opening (NVO) mode.

If the determination of Step S12 is YES, where the engine water temperature is below the second determination water temperature Tw2 (and is above the first determination water-temperature Tw1, i.e., if the temperature of the engine 1 is above the first determination temperature and below the second determination temperature), the PCM 50 sets the target intake valve timing and the target exhaust valve timing to the valve timings in the NVO mode (Step S13). As illustrated in FIG. 7, the valve timings in the NVO mode are valve timings at which a negative overlap in which the intake valve 13 and the exhaust valve 14 are both closed during a given period (negative overlap period) including an exhaust TDC occurs. Thus, at Step S13, the PCM 50 sets the target intake valve timing so that the open timing IVO of the intake valve 13 becomes a timing on the retarding side of the exhaust TDC, and sets the target exhaust valve timing so that the close timing EVC of the exhaust valve 14 becomes a timing on the advancing side of the exhaust TDC.

Further, the PCM 50 sets the target intake valve timing and the target exhaust valve timing to valve timings which satisfy the condition of the negative overlap occurring, based on the engine demanded torque calculated at Step S0, the engine speed, and the temperature of the engine 1. In this embodiment, the engine water temperature is used as the temperature of the engine 1, and each valve timing is set based on the engine demanded torque, the engine speed, and the engine water temperature.

For example, the PCM 50 extracts a map corresponding to the present engine water temperature from each map of the target intake valve timing and the target exhaust valve timing in the NVO mode about the engine speed and the engine demanded torque which are set beforehand and stored for each of different engine water temperatures, extracts values corresponding to the present engine speed and the engine demanded torque in each extracted map, and sets the extracted values as the target intake valve timing and the target exhaust valve timing.

Figure 8:
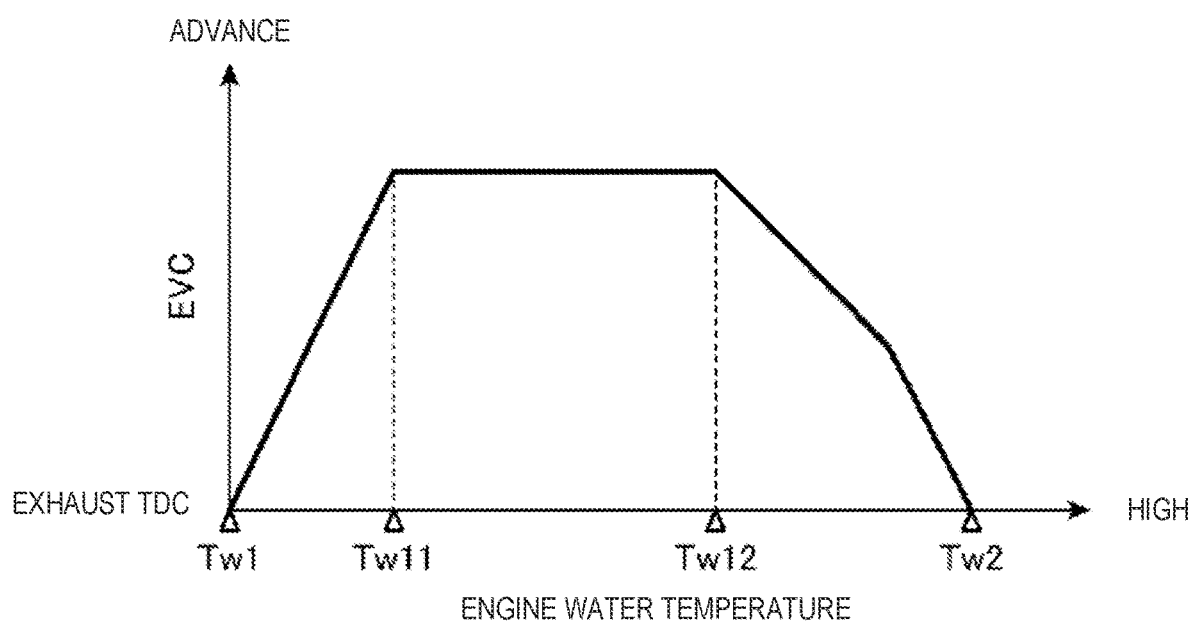
FIG. 8 is a graph illustrating a relationship between an engine water temperature and a close timing of the exhaust valve in the NVO mode.

Here, the target exhaust valve timing for the NVO mode is set as illustrated in FIG. 8 with respect to the engine water temperature. In detail, under the condition where the engine speed and the engine demanded torque stay the same, the target exhaust valve timing for the NVO mode is changed as illustrated in FIG. 8 according to the engine water temperature.

Concretely, within a range of the engine water temperature from the first determination water temperature Tw1 to a fourth determination water temperature Tw11, the target exhaust valve timing for the NVO mode is set so that the close timing EVC of the exhaust valve 14 is advanced as the engine water temperature increases. Further, within a range of the engine water temperature from the fourth determination water temperature Tw11 to a third determination water temperature Tw12, the target exhaust valve timing for the NVO mode is set so that the close timing EVC of the exhaust valve 14 is fixed regardless of the engine water temperature. Further, within a range from the third determination water temperature Tw12 to the second determination water temperature Tw2, the target exhaust valve timing for the NVO mode is set so that the close timing EVC of the exhaust valve 14 is retarded as the engine water temperature increases. In this embodiment, within the range from the third determination water temperature Tw12 to the second determination water temperature Tw2, the close timing EVC of the exhaust valve 14 is retarded as the engine water temperature increases. Note that the fourth determination water temperature Tw11 is above the first determination water temperature Tw1 and below the second determination water temperature Tw2, and the third determination water temperature Tw12 is above the fourth determination water temperature Tw11 and below the second determination water temperature Tw2. Here, the third determination water temperature Tw12 is an example of a "third determination temperature" in the present disclosure.

After setting the target intake valve timing and the target exhaust valve timing to the valve timings in the NVO mode as described above, the PCM 50 sets the injection timing to a timing in the NVO mode (Step S14). In this embodiment, the injection timing in the NVO mode is set to a timing in an intake stroke which is on the retarding side of the open timing IVO of the intake valve 13. For example, the PCM 50 extracts a value corresponding to the present engine speed and the engine demanded torque from a map of the injection timing in the NVO mode which is set beforehand and stored so as to satisfy the above-described condition for the engine speed and the engine demanded torque, and sets the extracted value as the injection timing.

Next, the PCM 50 issues a command to the throttle valve 18, the injector 8, and the spark plug 9 so that the throttle opening, the ignition timing, and the injection amount which are set at Step S1, and the injection timing set at Step S14 are realized (Step S6). Further, the PCM 50 issues a command to the intake SVT 21 and the exhaust SVT 20 so that each target valve timing set at Step S13 is realized (Step S6), and ends this processing (returns to Step S1). Note that in this embodiment, at Step S6 to which the processing proceeds to if the determination of Step S2 is NO and the determination of Step S12 is YES, the drive of the motor 31 as a generator is stopped.

Returning to Step S12, if the determination of Step S12 is NO, where the engine water temperature is above the second determination water temperature Tw2 (if the temperature of the engine 1 is above the second determination temperature), the PCM 50 sets the target intake valve timing and the target exhaust valve timing to the valve timings in a normal mode (Step S15). That is, if the engine water temperature is above the second determination water temperature Tw2 and the warm-up of the engine 1 is finished, the opening-and-closing timings of the intake valve 13 and the exhaust valve 14 are set to valve timings for normal traveling after the completion of the warm-up. For example, the PCM 50 extracts values corresponding to the present engine speed and the engine demanded torque from maps of the target intake valve timing and the target exhaust valve timing in the normal mode which are set beforehand and stored for the engine speed and the engine demanded torque, and sets the extracted values as the target intake valve timing and the target exhaust valve timing.

Next, the PCM 50 sets the injection timing to a timing in the normal mode (Step S16). For example, the PCM 50 extracts a value corresponding to the present engine speed and the engine demanded torque from a map of the injection timing in the normal mode which is set beforehand and stored for the engine speed and the engine demanded torque, and sets the extracted value as the injection timing.

After setting the target intake valve timing, the target exhaust valve timing, and the injection timing as the values in the normal mode as described above, the PCM 50 issues a command to the throttle valve 18, the injector 8, and the spark plug 9 so that the throttle opening, the ignition timing, and the injection amount which are set at Step S1, and the injection timing set at Step S16 are realized (Step S6). The PCM 50 also issues a command to the intake SVT 21 and the exhaust SVT 20 so that each target valve timing set at Step S15 is realized (Step S6), and ends this processing (returns to Step S1).

Figure 9:
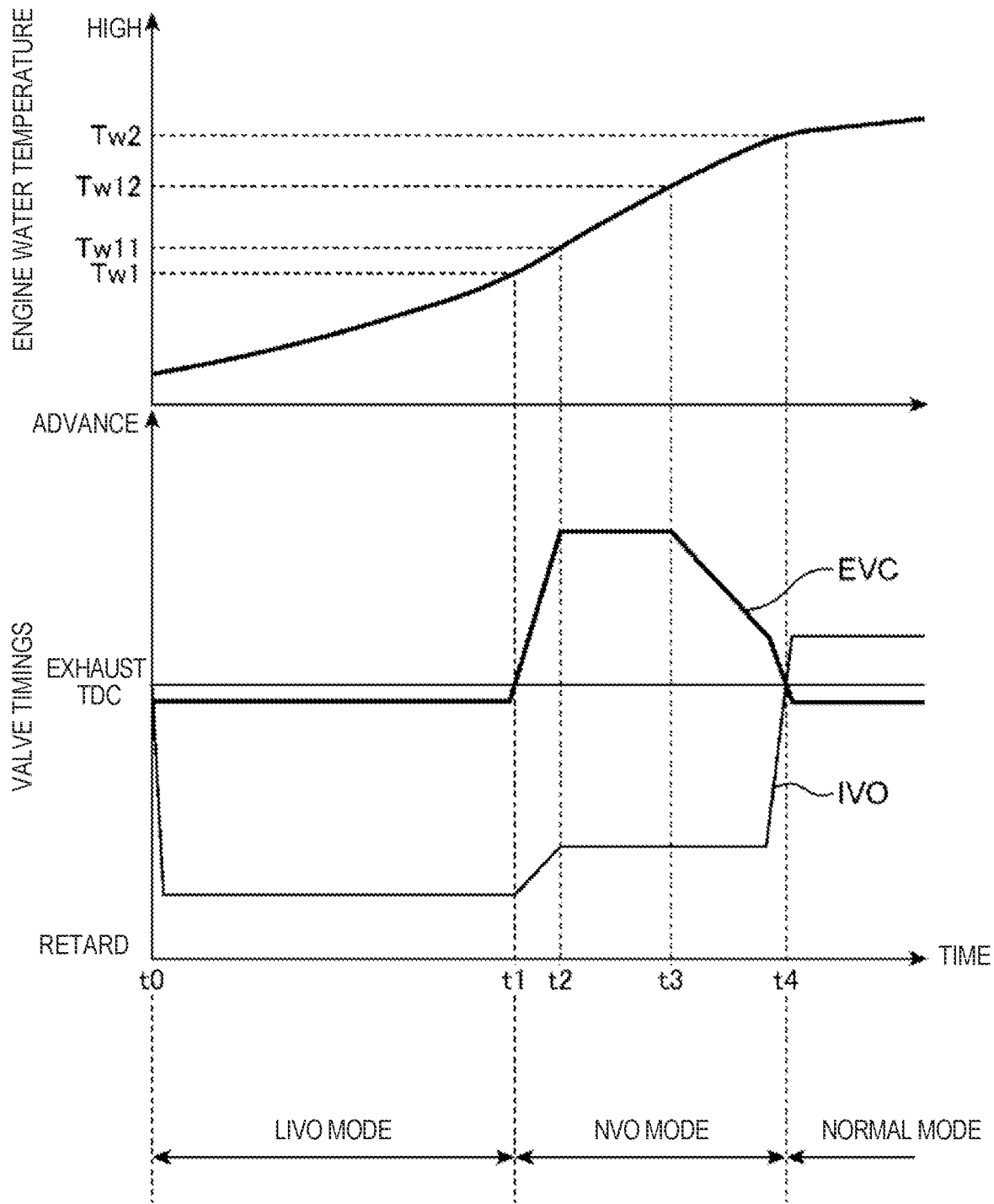
FIG. 9 is a time chart illustrating one example of changes in the engine water temperature and the valve timings after the engine is cold started.

FIG. 9 is a time chart illustrating temporal changes in the engine water temperature, the open timing IVO of the intake valve 13, and the close timing EVC of the exhaust valve 14, since the engine 1 is started while the engine water temperature is below the first determination water temperature Tw1 (i.e., since the engine 1 is cold-started).

In FIG. 9, the engine 1 is started at a time t0. As described above, in the example of FIG. 9, the engine 1 is started while the engine water temperature is below the first determination water temperature Tw1. Thus, after the time t0, the opening-and-closing timings of the intake valve 13 and the exhaust valve 14 are the valve timings in the LIVO mode. Therefore, the close timing EVC of the exhaust valve 14 is retarded from the exhaust TDC. Further, the open timing IVO of the intake valve 13 is retarded from the close timing EVC of the exhaust valve 14. Note that in this embodiment, while the engine 1 is stopped, the phase of the intake valve 13 is maintained at such a phase that its open timing IVO becomes near the exhaust TDC, and the phase of the exhaust valve 14 is maintained at such a phase that its close timing EVC becomes near the exhaust TDC. Thus, immediately after the time t0, the phase of the intake valve 13 is significantly retarded.

Further, after the time t0, combustion inside the combustion chamber C of the engine 1 is started. Thus, the engine water temperature increases gradually after the time t0, and reaches the first determination water temperature Tw1 at time t1.

Since the engine water temperature is below the first determination water temperature Tw1 during a period up to the time t1, the valve timings of the intake valve 13 and the exhaust valve 14 are maintained at the valve timings in the LIVO mode. In the example of FIG. 9, up to the time t1, the open timing IVO of the intake valve 13 and the close timing EVC of the exhaust valve 14 are maintained at a substantially constant value.

The engine water temperature exceeds the second determination water temperature Tw2 at time t4 after the time t1. Thus, during a period from the time t1 to the time t4, the valve timings of the intake valve 13 and the exhaust valve 14 are the valve timings in the NVO mode. Concretely, when the engine water temperature becomes above the first determination water temperature Tw1 at the timing t1, both the open timing IVO of the intake valve 13 and the close timing EVC of the exhaust valve 14 are advanced. Then, the open timing IVO of the intake valve 13 is set to a timing on the retarding side from the exhaust TDC and on the advancing side from the open timing IVO of the intake valve 13 in the LIVO mode. Further, the close timing EVC of the exhaust valve 14 in the NVO mode is set to a timing on the advancing side from the exhaust TDC.

As described above, in the NVO mode, within a range of the engine water temperature below the fourth determination water temperature Tw11, the close timing EVC of the exhaust valve 14 is advanced as the engine water temperature increases. In this embodiment, in the NVO mode, within the range of the engine water temperature below the fourth determination water temperature Tw11, the open timing IVO of the intake valve 13 is also advanced as the engine water temperature increases. Thus, during a period from the time t1 to time t2 at which the engine water temperature reaches the fourth determination water temperature Tw11, the close timing EVC of the exhaust valve 14 and the open timing IVO of the intake valve 13 are both advanced as the engine water temperature increases.

Further, in the NVO mode, within a range of the engine water temperature from the fourth determination water temperature Tw11 to the third determination water temperature Tw12, the close timing EVC of the exhaust valve 14 is fixed, regardless of the engine water temperature. In this embodiment, in the NVO mode, within the range of the engine water temperature from the fourth determination water temperature Tw11 to the third determination water temperature Tw12, the open timing IVO of the intake valve 13 is also fixed, regardless of the engine water temperature. Thus, during a period from the time t2 to the time t3 at which the engine water temperature reaches the third determination water temperature Tw12, the close timing EVC of the exhaust valve 14 and the open timing IVO of the intake valve 13 are maintained constant.

Further, in the NVO mode, within a range of the engine water temperature above the third determination water temperature Tw12, the close timing EVC of the exhaust valve 14 is retarded as the engine water temperature increases. Thus, after the time t3 (up to the time t4 at which the engine water temperature reaches the second determination water temperature Tw2), the close timing EVC of the exhaust valve 14 is retarded as the engine water temperature increases. In this embodiment, in the NVO mode, within the range of the engine water temperature above the third determination water temperature Tw12, the open timing IVO of the intake valve 13 is advanced as the engine water temperature increases. Thus, after the time t3 (up to the time t4 at which the engine water temperature reaches the second determination water temperature Tw2), the open timing IVO of the intake valve 13 is advanced with progress of time.

After the time t4 where the engine water temperature exceeds the second determination water temperature Tw2, the engine water temperature is maintained at a temperature above the second determination water temperature Tw2 until the engine 1 stops. Thus, after the time t4, the valve timings of the intake valve 13 and the exhaust valve 14 are set to the valve timings in the normal mode until the engine 1 stops. In the example of FIG. 9, after the time t4, the open timing IVO of the intake valve 13 is advanced from the exhaust TDC, and the close timing EVC of the exhaust valve 14 is retarded from the exhaust TDC.

Operation, Etc.

As described above, in the above embodiment, when the engine water temperature is above the first determination water temperature Tw1 and below the second determination water temperature Tw2, and the engine temperature is comparatively low, the exhaust target valve timing and the intake target valve timing are set to the valve timings in the NVO mode, and the exhaust valve 14 and the intake valve 13 are controlled so that the negative overlap in which the exhaust valve 14 and the intake valve 13 are both closed during the given period including the exhaust TDC occurs. That is, the exhaust valve 14 is closed while burnt gas inside the combustion chamber C is drawn to the exhaust port 12, and the intake valve 13 is opened at a timing where the piston 5 descends and adverse current of the burnt gas to the intake port 11 is suppressed.

Thus, according to the above embodiment, when the engine water temperature is above the first determination water temperature Tw1 and below the second determination water temperature Tw2, a comparatively large amount of hot burnt gas can be trapped inside the combustion chamber C, thereby increasing the temperature inside the combustion chamber C. If the temperature inside the combustion chamber C increases, evaporation of the fuel supplied into the combustion chamber C (as a result, combustion of the fuel) is stimulated. Further, if the temperature inside the combustion chamber C increases, the cooling loss is reduced. Therefore, according to the above embodiment, when the engine water temperature is above the first determination water temperature Tw1 and below the second determination water temperature Tw2, fuel efficiency is improved and the amounts of unburnt HC and soot which are discharged from the combustion chamber C are reduced, thereby improving exhaust performance.

However, since the burnt gas is inert gas, when the engine temperature is particularly low and a large amount of burnt gas remains inside the combustion chamber as described above, combustion may become unstable. On the other hand, in the above embodiment, when the engine water temperature is below the first determination water temperature Tw1, the valve timings of the intake valve 13 and the exhaust valve 14 are set to the valve timings in the LIVO mode, the close timing EVC of the exhaust valve 14 is set to a timing after the exhaust TDC and the open timing IVO of the intake valve 13 is set to a timing on the retarding side of the close timing EVC of the exhaust valve 14, and the injection timing of the injector 8 is set to a timing during an intake stroke on the retarding side of the close timing EVC of the exhaust valve 14 and the open timing IVO of the intake valve 13. Therefore, according to the above embodiment, also when the engine water temperature is below the first determination water temperature Tw1, the combustion stability is secured, the evaporation of fuel supplied to the combustion chamber C is stimulated by the effect of the negative pressure generated inside the combustion chamber C, and the amounts of unburnt HC and soot which are discharged from the engine body 2 are reduced.

Figure 10A:
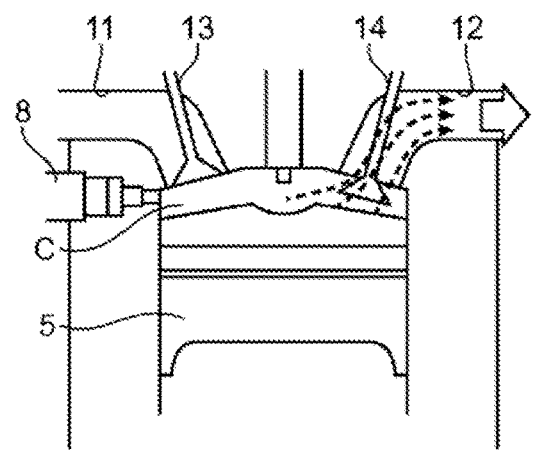
FIGS. 10A to 10C are outline cross-sectional views illustrating operation of the valve timings in the LIVO mode, where
Figure 10B:
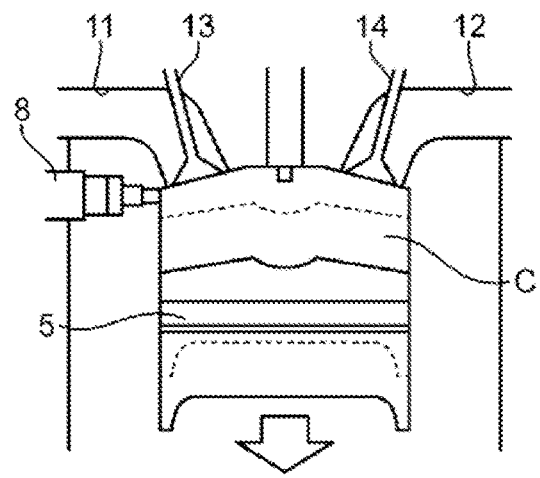
Figure 10C:
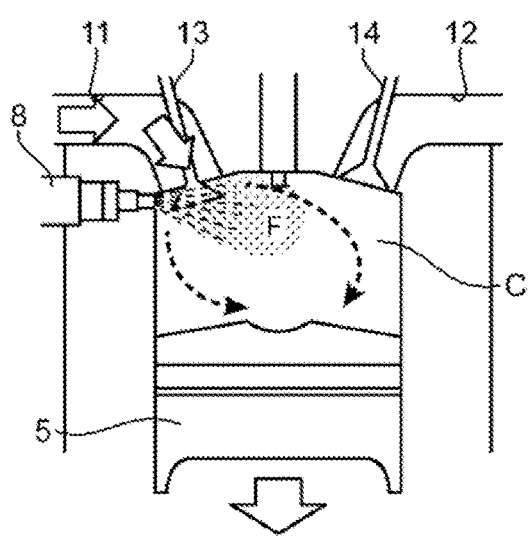

The above embodiment is described concretely with reference to FIGS. 10A to 10C. FIGS. 10A to 10C are outline cross-sectional views illustrating operation of the valve timings in the LIVO mode, where FIG. 10A is a view illustrating a situation inside the combustion chamber C before exhaust TDC, FIG. 10B is a view illustrating a situation inside the combustion chamber C after the exhaust TDC and before the open timing IVO of the intake valve, and FIG. 10C is a view illustrating a situation inside the combustion chamber C after the open timing IVO of the intake valve.

In the LIVO mode, the close timing EVC of the exhaust valve 14 is set to after exhaust TDC (a timing at the exhaust TDC or a timing on the retarding side of the exhaust TDC), and, as illustrated in FIG. 10A, the exhaust valve 14 is opened also at a timing when the volume of the combustion chamber C becomes the smallest. Therefore, in the LIVO mode, a large part of the burnt gas is discharged from the combustion chamber C to the exhaust port 12 and the exhaust passage 19, the combustion becoming unstable under the influence of the burnt gas is avoided, and combustion stability is secured.

Further, in the LIVO mode, the intake valve 13 is opened after the close timing EVC of the exhaust valve 14, and during the given period after the close timing EVC of the exhaust valve 14 in the intake stroke, both the intake valve 13 and the exhaust valve 14 are closed, as illustrated in FIG. 10B. Here, a large part of the burnt gas is discharged outside the combustion chamber C as described above. Thus, during a given period after the close timing EVC of the exhaust valve 14, the pressure inside the combustion chamber C becomes negative as the piston 5 descends as illustrated by a transition from a broken line to a solid line.

Then, when the engine water temperature is below the first determination water temperature Tw1, the injection timing of the injector 8 is set to a timing in an intake stroke on the retarding side of the close timing EVC of the exhaust valve 14, and, as illustrated in FIG. 10C, fuel F is injected into the combustion chamber C from the injector 8 in the state where the pressure inside the combustion chamber C is negative. That is, fuel is supplied to the atmosphere where the pressure is significantly low so that the evaporation temperature of the fuel is kept low. Thus, according to the above embodiment, also when the engine water temperature is below the first determination water temperature Tw1, the evaporation of fuel is stimulated and the amounts of discharge of unburnt HC and soot from the combustion chamber C are kept low.

Further, in the LIVO mode, by opening the intake valve 13 in the state where the pressure inside the combustion chamber C is negative as described above, intake air flow vigorously from the intake port 11 into the combustion chamber C in response to the opening of the intake valve 13, thereby forming a strong intake air flow inside the combustion chamber C. That is, kinetic energy of intake air is increased inside the combustion chamber C. Thus, the temperature inside the combustion chamber C is increased also in the LIVO mode, which also stimulates the evaporation of fuel. Particularly, in the above embodiment, since the injection timing of the injector 8 is set at a timing on the retarding side of the open timing IVO of the intake valve 13, and the fuel is supplied to the combustion chamber C in the state where the intake air flow occurs inside the combustion chamber C (i.e., the temperature inside the combustion chamber C is increased by the intake air flow), the evaporation of the fuel is stimulated certainly. Further, in the above embodiment, since the open timing IVO of the intake valve 13 in the LIVO mode is set to a timing on the retarding side of the open timing IVO of the intake valve 13 in the NVO mode, and the intake valve 13 is opened while the negative pressure inside the combustion chamber C is increased, the particularly strong intake air flow can be produced inside the combustion chamber C, thereby stimulating the evaporation of fuel certainly.

As described above, according to the above embodiment, when the engine water temperature is below the second determination water temperature Tw2, the amounts of unburnt HC and soot discharged from the combustion chamber C are kept low, while securing the combustion stability. Therefore, the exhaust performance is improved from immediately after the cold start of the engine 1.

Further, in the above embodiment, when the engine water temperature is below the first determination water temperature Tw1, and when the engine demanded torque is below the determination torque and the battery SOC is below the determination SOC, the motor 31 is driven as a generator. Therefore, the evaporation of fuel is further stimulated, while maintaining the torque to be transmitted to the driving wheels 37 from the engine 1 at the suitable torque.

Concretely, the motor 31 is driven as a generator, and the throttle opening and the injection amount are corrected so as to be increased so that the engine torque coincides with the sum total torque of the torque required for the motor 31 to operate as a generator and the torque to be transmitted to the driving wheels 37 from the engine 1. Therefore, the torque transmitted to the driving wheels 37 from the engine 1 is set to the demanded torque, and a larger amount of air is introduced into the combustion chamber C to increase the intake air flow inside the combustion chamber C (as a result, the temperature inside the combustion chamber C), thereby further stimulating the evaporation of fuel. Further, since a part of the engine torque which is excessive for the torque to be transmitted to the driving wheels 37 can be used as electric power, the fuel efficiency of the entire vehicle V is maintained appropriately. Particularly, in the above embodiment, since the above-described electric power is stored in the battery 33, it can be prevented that the electric power is consumed wastefully.

Further, in the above embodiment, when the engine water temperature is below the first determination water temperature Tw1, if the condition, in which the engine demanded torque is below the determination torque, and the battery SOC is more than the determination SOC so that it becomes an overcharge if any more electric power is supplied to the battery 33, is satisfied, the ignition timing is retarded more than when the engine water temperature is below the first determination water temperature Tw1 and the above-described condition is not satisfied, and when the engine water temperature is above the first determination water temperature Tw1 and below the second determination water temperature Tw2. Therefore, the evaporation of fuel is further stimulated, while maintaining the torque to be transmitted to the driving wheels 37 from the engine 1 at the suitable torque.

Concretely, when the ignition timing is retarded, the engine torque decreases. In this regard, when the above-described condition is satisfied, the ignition timing is retarded, while the throttle opening and the injection amount are corrected so as to be increased so that the engine torque coincides with the torque to be transmitted to the driving wheels 37 from the engine 1. That is, while retarding the ignition timing, the decrease in the engine torque accompanying the retard of the ignition timing is compensated by the increase in the throttle opening and the injection amount.

Therefore, while setting the torque transmitted to the driving wheels 37 from the engine 1 to the demanded torque, a larger amount of air is introduced into the combustion chamber C so that the intake air flow inside the combustion chamber C (as a result, the temperature inside the combustion chamber C) is increased, thereby further stimulating the evaporation of fuel. Further, when the ignition timing is retarded, the temperature of exhaust gas when the exhaust valve 14 is opened increases. Therefore, hotter exhaust gas is introduced into the catalyst device 23, and the activation of the catalyst device 23 is stimulated.

Further, in the above embodiment, when the target intake valve timing and the target exhaust valve timing are set to the valve timings in the NVO mode and the engine water temperature is above the third determination water temperature Tw12, the close timing EVC of the exhaust valve 14 is retarded as the engine water temperature increases. Therefore, when the engine water temperature is comparatively low and the temperature inside the combustion chamber C is low, the amount of burnt gas which remains inside the combustion chamber C is increased by closing the exhaust valve 14 earlier, thereby increasing the temperature inside the combustion chamber C appropriately. Further, when the engine water temperature is comparatively high and the temperature inside the combustion chamber C is high, the amount of burnt gas which remains inside the combustion chamber is lessened by closing the exhaust valve 14 at a comparatively late timing, thereby preventing that the temperature inside the combustion chamber C increases excessively.

Modifications

In the above embodiment, when the engine water temperature is above the first determination water temperature Tw1 and below the second determination water temperature Tw2, the target intake valve timing and the target exhaust valve timing are set to the valve timings at which the intake valve 13 and the exhaust valve 14 form the negative valve overlap. However, alternatively, when the engine water temperature is above the first determination water temperature Tw1 and below the second determination water temperature Tw2, the target intake valve timing and the target exhaust valve timing may be set to valve timings at which the intake valve 13 and the exhaust valve 14 form a positive valve overlap.

Figure 11:
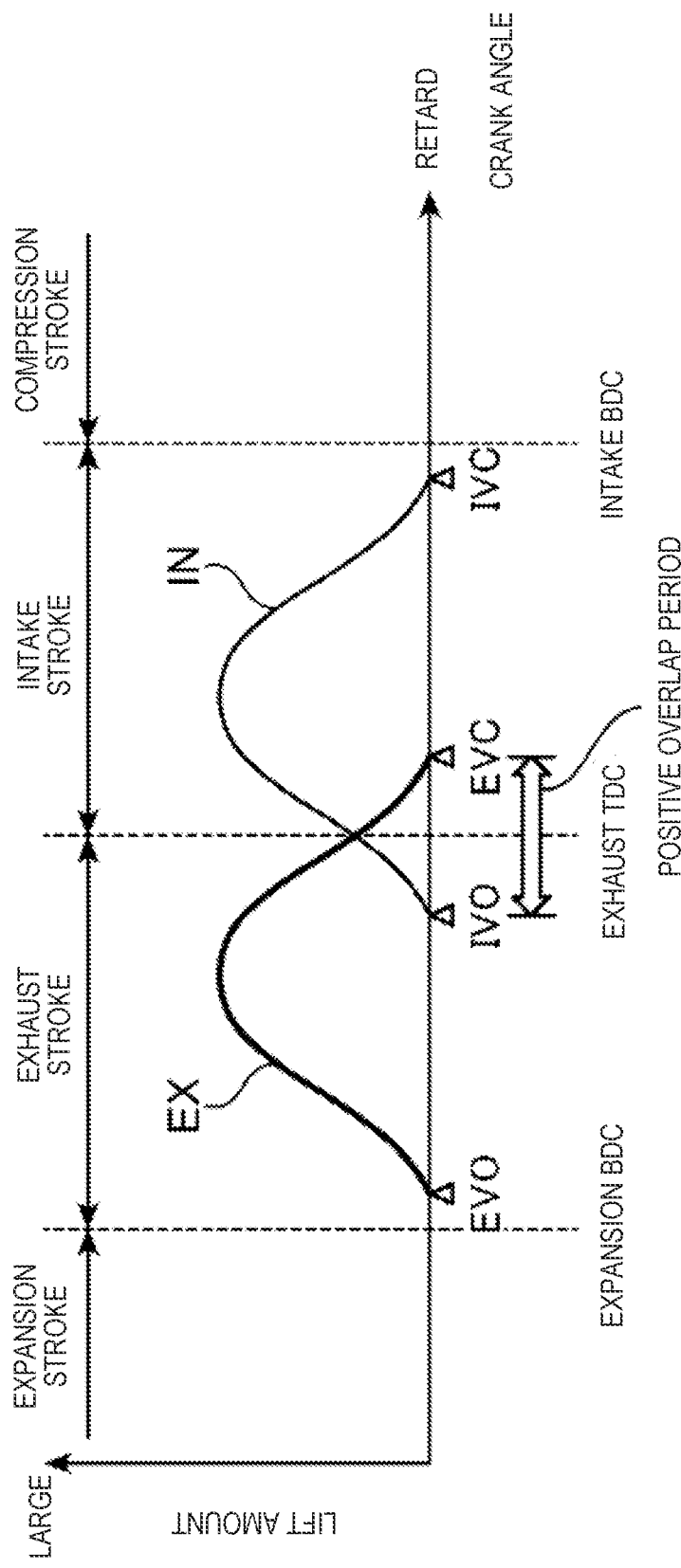
FIG. 11 is a view illustrating another example of the valve lifts of the intake valve and the exhaust valve when the engine water temperature is above a first determination water temperature and below a second determination water temperature.

Concretely, when the engine water temperature is above the first determination water temperature Tw1 and below the second determination water temperature Tw2, as illustrated in FIG. 11, the open timing IVO of the intake valve 13 may be set to a timing on the advancing side of the exhaust TDC, and the close timing EVC of the exhaust valve 14 may be set to a timing on the retarding side of the exhaust TDC to open and close the exhaust valve 14 and the intake valve 13 so that the positive overlap in which both the exhaust valve 14 and the intake valve 13 are opened during a given period including the exhaust TDC occurs.

Also in this configuration, a larger amount of burnt gas remains inside the combustion chamber C, similarly to the case of the negative valve overlap. Therefore, similarly to the above embodiment, when the engine water temperature is above the first determination water temperature Tw1 and below the second determination water temperature Tw2, it is possible to increase the temperature inside the combustion chamber C to stimulate the evaporation of fuel. In detail, in the case of the positive overlap, during the given period before the exhaust TDC, the burnt gas inside the combustion chamber C is drawn to the intake port 11 and the exhaust port 12 because both the intake valve 13 and the exhaust valve 14 are opened. However, since both the intake valve 13 and the exhaust valve 14 are opened even after the exhaust TDC, the burnt gas drawn to these ports 11 and 12 can be introduced again into the combustion chamber C so that a large amount of burnt gas remains inside the combustion chamber C after the intake valve 13 is closed.

However, as described above, when the engine water temperature is below the first determination water temperature Tw1, the close timing of the intake valve 13 is set to a timing on the retarding side of the exhaust TDC. Therefore, like the above embodiment, when the engine water temperature is above the first determination water temperature Tw1 and below the second determination water temperature Tw2, by setting the target intake valve timing and the target exhaust valve timing to the valve timings at which the intake valve 13 and the exhaust valve 14 form the negative valve overlap, and setting the open timing IVO of the intake valve 13 to the timing on the retarding side of the exhaust TDC, an amount of change in the open timing IVO of the intake valve 13 when the engine water temperature increases from the temperature below the first determination water temperature Tw1 to a temperature above the first determination water temperature is kept small. Therefore, when the engine water temperature exceeds the first determination water temperature Tw1, the open timing IVO of the intake valve 13 can be controlled earlier to a suitable timing.

Further, in the above embodiment, the determination of whether the temperature of the engine 1 is below the first determination temperature at Step S2, and the determination of whether the temperature of the engine 1 is below the second determination temperature at Step S12 are performed using the engine water temperature. However, alternatively, these determinations may be performed using the temperature of the catalyst device 23. Concretely, at Step S2, instead of the determination of whether the engine water temperature is below the first determination water temperature, a determination of whether the catalyst temperature detected by the catalyst temperature sensor SN6 is below a given first determination catalyst temperature may be performed. Similarly, at Step S12, instead of the determination of whether the engine water temperature is below the second determination water temperature, a determination of whether the catalyst temperature detected by the catalyst temperature sensor SN6 is below a given second determination catalyst temperature (a temperature above the first determination catalyst temperature) may be performed. Further, although in the above embodiment the close timing EVC of the exhaust valve 14 is changed according to the engine water temperature at the valve timing in the NVO mode, the close timing EVC of the exhaust valve 14 may be changed according to the catalyst temperature, instead of the engine water temperature. For example, in the NVO mode, when the catalyst temperature is above a third determination catalyst temperature (a temperature above the second determination catalyst temperature), the valve timing of the exhaust valve 14 may be set so that the close timing EVC of the exhaust valve 14 is advanced as the catalyst temperature increases.

In the above embodiment, as the phase variable device which changes the phases (opening-and-closing timings) of the intake valve 13 and the exhaust valve 14, the intake SVT 21 and the exhaust SVT 20 which change the phases of the intake valve 13 and the exhaust valve 14, while maintaining the lift amount and the valve opening period constant, are used. Alternatively, a phase variable device which changes the lift amount or the valve opening period along with the valve phase may be used.

In the above embodiment, the injector 8 which is attached to the cylinder head 4 and injects fuel into the combustion chamber C is used. Alternatively, an injector which is attached to the intake port 11, and injects fuel into the intake port 11 to supply the fuel to the combustion chamber C via the intake port 11 may be used.

Although in the above embodiment the hybrid vehicle V uses the engine 1 comprised of the four-cycle gasoline engine which uses gasoline as fuel, and the electric motor 31, vehicles to which the present disclosure is applicable are not limited to this configuration. For example, the present disclosure may be applied to vehicles which have only the engine as the drive source. Further, the type of engine fuel is not limited to the above.

In the above embodiment, when the engine water temperature is below the first determination water temperature Tw1, the injection timing of the injector 8 is set to a timing on the retarding side of the open timing IVO of the intake valve 13. Alternatively, the injection timing may be set to a timing on the advancing side of the open timing IVO of the intake valve 13, as long as it is in an intake stroke on the retarding side of the close timing EVC of the exhaust valve 14. However, as described above, if the injection timing of the injector 8 is set to the timing on the retarding side of the open timing IVO of the intake valve 13, the evaporation of fuel can be stimulated effectively by the effect of the intake air flow inside the combustion chamber C.

In the above embodiment, when the engine water temperature is below the first determination water temperature Tw1, the control for increasing the throttle opening, while using the motor 31 as a generator, or the control for increasing the throttle opening, while retarding the ignition timing, is performed only when the engine demanded torque is below the given determination torque. However, each control described above may be carried out regardless of the engine demanded torque. Note that depending on the configuration of the throttle valve 18 and the configuration of the device which changes the phase of the intake valve 13, the engine demanded torque may be high so that the throttle opening for realizing the engine demanded torque becomes near the maximum opening, or so that the phase of the intake valve 13 for realizing the engine demanded torque becomes near a phase at which the amount of intake air introduced into the combustion chamber C becomes the maximum, and thereby, the engine torque may not fully increase, even if the throttle opening is further increased. Thus, in such a case, it is preferred to carry out the above-described control only when the engine demanded torque is comparatively low, as described above.

Further, the above-described control for increasing the throttle opening, while using the motor 31 as a generator, may be omitted. For example, for vehicles not provided with the motor 31 which generates power by being driven by the engine 1, the control concerned may be omitted, and a control for increasing the throttle opening, while retarding the ignition timing regardless of the battery SOC, may be carried out when a condition of the engine water temperature being below the first determination water temperature Tw1 and the engine demanded torque being below the given determination torque is satisfied.

In the above embodiment, when the engine water temperature is below the second determination water temperature Tw2, the motor 31 is used as a generator only when the condition of the engine water temperature being below the first determination water temperature Tw1, the engine demanded torque being below the determination torque, and the battery SOC being below the determination SOC, is satisfied. However, the motor 31 may be used as a generator, regardless of the engine water temperature, the engine demanded torque, and the battery SOC. Note that if the motor 31 is used as a generator regardless of the engine water temperature when the engine water temperature is below the second determination water temperature Tw2, it is preferred to set the power generating amount when the above-described condition is satisfied (when the condition of the engine water temperature being below the first determination water temperature Tw1, the engine demanded torque being below the determination torque, and the battery SOC being below the determination SOC is satisfied) to be larger than when the condition is not satisfied. Thus, the exhaust performance is improved, while improving fuel efficiency, when the above-described condition is satisfied, as described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
8 Injector (Fuel Supply Device)
9 Spark Plug
2 Engine Body
13 Intake Valve
14 Exhaust Valve
20 Exhaust SVT (Exhaust Valve Phase Variable Device)
21 Intake SVT (Intake Valve Phase Variable Device)
31 Motor (Generator)
50 PCM (Control Device)
C Combustion Chamber

What is claimed is:

1. A control system for an engine provided with an engine body where a combustion chamber is formed, a fuel supply device configured to supply fuel to the combustion chamber, an intake valve configured to open and close an intake port configured to introduce intake air into the combustion chamber, and an exhaust valve configured to open and close an exhaust port configured to draw exhaust gas from the combustion chamber, the control system comprising:

an intake valve phase variable device configured to change a phase of the intake valve;

an exhaust valve phase variable device configured to change a phase of the exhaust valve; and a control device configured to control the fuel supply device, the intake valve phase variable device, and the exhaust valve phase variable device, the control device being configured to:

when a first condition in which a temperature of the engine is below a given first determination temperature is satisfied, control the exhaust valve phase variable device so that a close timing of the exhaust valve is at or retarded from an exhaust top dead center, control the intake valve phase variable device so that an open timing of the intake valve is retarded from the close timing of the exhaust valve, and control the fuel supply device so that the fuel supply to the combustion chamber is started in an intake stroke on a retarding side of the close timing of the exhaust valve; and when a second condition in which the engine temperature is above the first determination temperature and below a given second determination temperature is satisfied, control the intake valve phase variable device and the exhaust valve phase variable device so that a negative overlap in which the exhaust valve and the intake valve are both closed during a given period including the exhaust top dead center occurs, or so that a positive overlap in which the exhaust valve and the intake valve are both opened during a given period including the exhaust top dead center occurs, wherein the engine is coupled to a generator configured to generate power by being driven by the engine, and the control device controls the generator so that a power generating amount of the generator is greater when the first condition is satisfied than when the second condition is satisfied.

2. The control system of claim 1, wherein when the first condition is satisfied, the control device controls the fuel supply device so that the fuel supply to the combustion chamber is started at a timing on the retarding side of the open timing of the intake valve.

3. The control system of claim 2,
wherein the engine is provided with a spark plug configured to ignite a mixture gas including the fuel supplied to the combustion chamber and air, and
wherein the control device controls the spark plug so that an ignition timing of the spark plug is retarded more when the first condition is satisfied than when the second condition is satisfied.

4. The control system of claim 1,
wherein the engine is provided with a spark plug configured to ignite a mixture gas including the fuel supplied to the combustion chamber and air, and
wherein the control device controls the spark plug so that an ignition timing of the spark plug is retarded more when the first condition is satisfied than when the second condition is satisfied.

5. A control system for an engine provided with an engine body where a combustion chamber is formed, a fuel supply device configured to supply fuel to the combustion chamber, an intake valve configured to open and close an intake port configured to introduce intake air into the combustion chamber, and an exhaust valve configured to open and close an exhaust port configured to draw exhaust gas from the combustion chamber, the control system comprising:
an intake valve phase variable device configured to change a phase of the intake valve;
an exhaust valve phase variable device configured to change a phase of the exhaust valve; and
a control device configured to control the fuel supply device, the intake valve phase variable device, and the exhaust valve phase variable device, the control device being configured to:
when a first condition in which a temperature of the engine is below a given first determination temperature is satisfied, control the exhaust valve phase variable device so that a close timing of the exhaust valve is at or retarded from an exhaust top dead center, control the intake valve phase variable device so that an open timing of the intake valve is retarded from the close timing of the exhaust valve, and control the fuel supply device so that the fuel supply to the combustion chamber is started in an intake stroke on a retarding side of the close timing of the exhaust valve;
when a second condition in which the engine temperature is above the first determination temperature and below a given second determination temperature is satisfied, control the intake valve phase variable device and the exhaust valve phase variable device so that a negative overlap in which the exhaust valve and the intake valve are both closed during a given period including the exhaust top dead center occurs, or so that a positive overlap in which the exhaust valve and the intake valve are both opened during a given period including the exhaust top dead center occurs;
when the second condition is satisfied, control the intake valve phase variable device and the exhaust valve phase variable device so that the negative overlap occurs; and
when the second condition is satisfied and the engine temperature is above a third determination temperature above the first determination temperature, control the exhaust valve phase variable device so that the close timing of the exhaust valve is retarded more as the engine temperature increases.

6. A control system for an engine provided with an engine body where a combustion chamber is formed, a fuel supply device configured to supply fuel to the combustion chamber, an intake valve configured to open and close an intake port configured to introduce intake air into the combustion chamber, and an exhaust valve configured to open and close an exhaust port configured to draw exhaust gas from the combustion chamber, the control system comprising:
an intake valve phase variable device configured to change a phase of the intake valve;
an exhaust valve phase variable device configured to change a phase of the exhaust valve; and
a control device configured to control the fuel supply device, the intake valve phase variable device, and the exhaust valve phase variable device, the control device being configured to:
when a first condition in which a temperature of the engine is below a given first determination temperature is satisfied, control the exhaust valve phase variable device so that a close timing of the exhaust valve is at or retarded from an exhaust top dead center, control the intake valve phase variable device so that an open timing of the intake valve is retarded from the close timing of the exhaust valve, and control the fuel supply device so that the fuel supply to the combustion chamber is started in an intake stroke on a retarding side of the close timing of the exhaust valve;
when a second condition in which the engine temperature is above the first determination temperature and below a given second determination temperature is satisfied, control the intake valve phase variable device and the exhaust valve phase variable device so that a negative overlap in which the exhaust valve and the intake valve are both closed during a given period including the exhaust top dead center occurs, or so that a positive overlap in which the exhaust valve and the intake valve are both opened during a given period including the exhaust top dead center occurs;
when the second condition is satisfied, control the intake valve phase variable device and the exhaust valve phase variable device so that the negative overlap occurs; and
when the second condition is satisfied, control the intake valve phase variable device so that the open timing of the intake valve when the first condition is satisfied is retarded from the open timing of the intake valve.

* * * * *